United States Patent [19]

Sano et al.

[11] Patent Number: 5,604,170
[45] Date of Patent: Feb. 18, 1997

[54] SOLID CATALYST COMPONENTS FOR OLEFIN POLEMERIZATION AND USE THEREOF

[75] Inventors: Akira Sano; Kunimichi Kubo, both of Tokyo; Kazuo Matsuura; Yoshio Tajima, both of Yokohama, all of Japan

[73] Assignee: Nippon Oil Company, Limited, Tokyo, Japan

[21] Appl. No.: 199,561

[22] Filed: Feb. 22, 1994

[30]  Foreign Application Priority Data

Feb. 23, 1993  [JP]  Japan ................................. 5-072730
Feb. 23, 1993  [JP]  Japan ................................. 5-072733
Feb. 23, 1993  [JP]  Japan ................................. 5-072734

[51] Int. Cl.$^6$ ........................................ C08F 4/64
[52] U.S. Cl. ..................... 502/115; 502/113; 502/117
[58] Field of Search ................................ 502/113, 115, 502/116, 117, 129, 132

[56]  References Cited

U.S. PATENT DOCUMENTS

| | | | |
|---|---|---|---|
| 3,278,511 | 10/1966 | Langer ............................. | 502/118 |
| 3,394,118 | 7/1968 | Boor, Jr. ........................... | 502/118 |
| 4,808,561 | 2/1989 | Welborn, Jr. ..................... | 502/113 |
| 4,849,390 | 7/1989 | Sano et al. ....................... | 502/132 |
| 4,874,734 | 10/1989 | Kioka et al. ..................... | 502/113 |
| 4,876,229 | 10/1989 | Furtek .............................. | 502/112 |
| 4,940,682 | 7/1990 | Sasaki et al. .................... | 502/132 |

*Primary Examiner*—Glenn A. Caldarola
*Attorney, Agent, or Firm*—Dilworth & Barrese

[57]  ABSTRACT

An effective catalyst carrier for use in the polymerization of olefins is provided.

Said carrier comprises particles of silicon oxide or aluminum oxide satisfying the following characteristics (A) to (E):

(A) An average particle diameter as measured by the sieving method is in the range of 20 to 150 μm.

(B) A specific surface area as measured by the BET method is in the range of 150 to 600 m$^2$/g.

(C) The volume of pores ranging in pore radius from 18 to 1,000 Angstroms as measured by the mercury penetration method is in the range of 0.3 to 2.0 cm$^3$/g.

(D) An apparent specific gravity as measured according to JIS K6220-6.8 is not lower than 0.32.

(E) After the particles classified in the range of between 53 μm and 75 μm by the sieving method have been subjected to an ultrasonic disintegration treatment at 40 KHz, 35 W, for 20 minutes, the proportion of 50 μm or smaller particles, i.e., degree of ultrasonic disintegration, is not more than 30%.

7 Claims, No Drawings

SOLID CATALYST COMPONENTS FOR OLEFIN POLEMERIZATION AND USE THEREOF

BACKGROUND OF THE INVENTION

The present invention relates to solid catalyst components using a novel carrier for use in the preparation of polyolefins and use thereof. More particularly, the present invention is concerned with solid catalyst components suitable for the preparation of polyolefins having superior particle properties such as, for example, high bulk density, large average particle diameter and reduced proportion of a fine powder, which catalyst components are capable of greatly increasing the polymer yield per solid and that per transition metal and hence permits the omission of the step for removing the residual catalyst from the polymer.

Heretofore, in this field of art there have been known various catalysts comprising an inorganic magnesium compound as carrier, e.g. magnesium halide or magnesium oxide, and titanium and/or vanadium supported thereon. However, polyolefins obtained by using such catalysts have a relatively small average particle diameter, a generally wide particle size distribution, a large proportion of a fine powder and a generally low bulk density.

Therefore, improvements have keenly been desired from the standpoint of productivity or polymer handling in the polymerization process. Further, also in molding those polymers, there arise problems such as the generation of dust and the deterioration of the molding efficiency. For this reason, it has been desired earnestly to increase the bulk density and decrease the proportion of a fine powder.

In an effort to solve the above-mentioned problems there also have been proposed many catalysts comprising a particulate carrier such as silica, alumina or silica-alumina and the foregoing magnesium compound and titanium and/or vanadium supported thereon (see, for example, JP1-11651B, JP1-12289B, JP60-149605A, JP62-32105A and JP62-207306A). Although polymers somewhat high in bulk density and large in average particle diameter can be obtained by using those known catalysts, a further improvement has been considered necessary for processing the polymer powder in a processing machine directly without going through a pelletizing step.

Using a catalyst comprising a zirconium compound (typically a metallocene compound) and an aluminoxane in the preparation of a polyolefin is known from JP58-19309A. The use of the said catalyst is advantageous in that ethylene copolymers can be produced in high yield. In many cases, however, such catalyst is soluble in the reaction system, so when used in slurry polymerization or vapor-phase polymerization, the resulting polymer is extremely low in bulk density and inferior in particle properties.

On the other hand, the use of a catalyst comprising a solid catalyst component and an aluminoxane, the solid catalyst component comprising a porous inorganic oxide carrier such as silica or silica-alumina and a transition metal compound supported thereon, has also been proposed, for example, in JP60-35006A, JP60-35007A and JP60-35008A. The use of a similar solid catalyst component including a porous inorganic oxide carrier has also been proposed, for example, in JP61-31404A, JP61-108610A and JP60-106808A. In many of the methods described in these prior art publications, however, by using such supported solid catalyst components, the polymerization activity is lowered to a large extent or particle properties of the resulting polymer are inferior, for example, the proportion of fine and coarse particles is large and the bulk density is low.

In JP63-234005A it is proposed to increase the molecular weight of the resulting polymer by using a transition metal compound having a 2-, 3- and 4-substituted cyclopentadienyl group, and for the same purpose, it is proposed in JP2-22307A to use a hafnium compound having a ligand combined with at least two crosslinked conjugated cycloalkadienyl.

As to these catalysts, however, their synthesis route and operations for their preparation are complicated, and in the case of using hafnium as a transition metal, the yield of the resulting polymer becomes lower. In many cases, moreover, these conventional catalysts are soluble in the reaction system, so their use in slurry polymerization or vapor-phase polymerization results in the formation of a polymer extremely low in bulk density and inferior in particle properties.

It is an object of the present invention to solve the above-mentioned problems of the prior art.

It is another object of the present invention to provide a catalyst component and a catalyst capable of greatly increasing the polymer yield per solid and that per transition metal to the extent of eliminating the need of removing residual catalyst from the resulting polymer and also capable of affording a polyolefin having good particle properties such as, for example, high bulk density, large average particle diameter and reduced proportion of a fine powder, as well as a process for preparing an olefin polymer having such excellent properties.

Further objects of the present invention will become apparent from the following description.

SUMMARY OF THE INVENTION

The present invention, in a first aspect thereof, resides in a solid catalyst component for olefin polymerization, comprising a transition metal component and the particles of at least one oxide selected from silicon oxides and aluminum oxides both satisfying the following characteristics (A) to (E):

(A) An average particle diameter as measured by the sieving method is in the range of 20 to 150 µm.

(B) A specific surface area as measured by the BET method is in the range of 150 to 600 m$^2$/g (C) The volume of pores ranging in pore radium from 18 to 1,000 Angstroms as measured by the mercury penetration method is in the range of 0.3 to 2.0 cm$^3$/g.

(D) An apparent specific gravity as measured according to JIS K-6220-6.8 is not lower than 0.32.

(E) After the particles classified in the range of between 53 µm and 75 µm by the sieving method have been subjected to an ultrasonic disintegration treatment at 40 KHz, 35 W, for 20 minutes, the proportion of 50 µm or smaller particles, i.e., degree of ultrasonic disintegration, is not more than 30%.

As the above transition metal component there may be used:

(a) a transition metal component comprising at least magnesium; titanium and/or vanadium; and halogen;

(b) a transition metal component comprising:
  (1) a compound of the general formula Me$^1$R$^1_n$X$^1_{4-n}$
    where R$^1$ is a hydrocarbon radical having 1 to 24 carbon atoms, $X^1$ is a halogen atom, $Me^1$ is Zr, Ti or Hf, and n is $0 \leq n \leq 4$, (2) a compound of the general formula $Me^2R^2_mX^2_{z-m}$ where $R^2$ is a hydrocarbon radical having 1 to 24 carbon atoms, $X^2$ is a halogen atom, $Me^2$ is a Group I–III element of the Periodic Table, z is the valence of $Me^2$, and m is $0<m<z$, and (3) an organocyclic compound having two or more conjugated double bonds; or (c) a transition metal compound of a Group IV metal in the Periodic Table, having at least a cycloalkadienyl ring.

By combining the solid catalyst component which constitutes the transition metal component (a) with an ordinary organometallic compound there is obtained an olefin polymerizing catalyst.

By combining the solid catalyst component which constitutes the transition metal component (b) or (c) with a modified organoaluminum compound prepared by the reaction of an organoaluminum compound with water and having Al—O—Al bond, there is obtained an olefin polymerizing catalyst.

DETAILED DESCRIPTION OF THE INVENTION

The present invention will be described in more detail hereinunder.

[1] Silicon Oxide and/or Aluminum Oxide

The silicon oxide used in the present invention is silica or a double oxide of silicon and at least one another metal selected from Groups I–VI of the Periodic Table.

The aluminum oxide used in the present invention is alumina or a double oxide of aluminum and at least one another metal selected from Groups I–VI in the Periodic Table.

As typical examples of the double oxide of silicon or aluminum and at least one another metal selected from Groups I–VI in the Periodic Table there are mentioned various natural and synthetic double oxides such as $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$, and $SiO_2 \cdot MgO$. It is to be noted that these formulae are not molecular formulae but represent only compositions and that the structure and component ratio of the double oxide used in the present invention are not specially limited thereby. It goes without saying that the silicon oxide and/or aluminum oxide used in the present invention may have a small amount of water absorbed therein or may contain a small amount of impurities.

No matter which metal oxide may be used, it is important for the metal oxide to satisfy the following characteristics (A) to (E).

(A) An average particle diameter as measured by the sieving method is in the range of 20 to 150 μm, preferably 25 to 100 μm, more preferably 30 to 70 μm. If the average particle diameter is smaller than 20 μm, particularly in vapor phase polymerization, the amount of catalyst scattered from the reactor or that of fine polymer particles deposited on the reactor wall increases, thus inducing the formation of a sheet-like polymer, or during molding, there may occur blowing-up of polymer. If the average particle diameter is larger than 150 μm, the bulk density of the resulting polymer will become lower, and particularly when film is formed using the polymer, the film will have an increased number of fish-eyes.

(B) A specific surface area as measured by the BET method is in the range of 150 to 600 $m^2/g$, preferably 200 to 500 $m^2/g$, more preferably 250 to 400 $m^2/g$. If the specific surface area is smaller than 150 $m^2/g$, it is generally impossible to fully support the catalyst component to be supported though this point differs depending on the catalyst component and composition used. On the other hand, if the specific surface area is larger than 600 $m^2/g$, a side reaction is apt to occur when the catalyst component used is supported on the metal oxide, due to a too large quantity of surface hydroxyl group, and the quantity of unreacted hydroxyl groups also increases, thus causing deterioration of the catalytic activity.

(C) The volume of pores ranging in pore radius from 18 to 1,000 Angstroms as measured by the mercury penetration method is in the range of 0.3 to 2.0 $cm^3/g$, preferably 0.6 to 1.8 $cm^3/g$, more preferably 0.9 to 1.5 $cm^3/g$. If the pore volume is smaller than 0.3 $cm^3/g$, it will be impossible to fully support the catalyst component used, while if the pore volume is larger than 2.0 $cm^3/g$, there easily occurs localization of the catalyst component used, and in both cases the bulk density of the resulting polymer will be low.

(D) An apparent specific gravity as measured according to JIS K6220-6.8 is not lower than 0.32, preferably not Lower than 0.35, more preferably not lower than 0.37. If the apparent specific gravity is lower than 0.32, there arises the necessity of increasing the size of the vessel for preparing the solid catalyst component to be used, but this is disadvantageous when viewed from the industrial standpoint. Besides, the bulk density of the solid catalyst component prepared is low, so particularly in vapor phase polymerization and in the case of feeding the solid catalyst component as powder to the reactor, a larger size of apparatus for feeding the solid catalyst component is required, which is disadvantageous industrially. The bulk density of the resulting polymer also tends to become lower although the reason for such a tendency is not clear.

(E) After particles classified in the range of between 53 μm and 75 μm by the sieving method have been subjected to an ultrasonic disintegration treatment at 40 KHz, 35 W, for 20 minutes, the proportion of 50 μm or smaller particles, i.e., degree of ultrasonic disintegration, is not more than 30%, preferably not more than 20%, more preferably not more than 15%. If the proportion of 50 μm or smaller particles after the ultrasonic disintegration treatment is larger than 30%, that is, if the particles are easily disintegrated, the metal oxide will be disintegrated by an agitation force at the time of preparing a catalyst using the metal oxide, thus resulting in that the solid catalyst component obtained is ill-shaped. Consequently, the shape of polymer-produced using the solid catalyst component is also bad and the bulk density thereof is low.

Various methods are available for preparing the metal oxide used in the invention. For example, as to silica, there may be adopted either the following method 1) or 2).

1) First, a silica hydrogel is prepared by the reaction of an aqueous alkali silicate solution and an aqueous acid solution. The hydrogel is then pulverized coarsely using a dry type impact mill, followed by wet pulverization using a beads mill or a pot mill. The resulting slurry is then dried using a spray dryer to obtain silica in the form of microspheres, followed by further drying at about 200° C. to remove water, thereby affording a microsphere silica to be used in the invention.

More specifically, as the starting alkali silicate there may be used the sodium silicate or potassium silicate of water glass defined as an industrial product by JIS, or an alkali silicate obtained by reacting a highly reactive silica recovered from a clayish material such as acid clay with an alkali metal hydroxide solution.

The concentration of $SiO_2$ in the aqueous alkali silicate solution is in the range of 6 to 28 wt %, preferably diluted to about 10 wt %. The molar ratio of $SiO_2$: $M_2O$ (M is an alkali metal) is usually in the range from 2:1 to 4:1, preferably 2.5:1 to 3:1.

As a mineral to be used in the neutralization reaction, there usually is employed hydrochloric acid or sulfuric acid, but a mixed acid thereof is also employable. The concentration of the aqueous mineral acid solution is usually in the range of 10 to 75 wt %, preferably 20 to 60 wt %.

Regarding how to carry out the neutralization reaction involving contact of both starting materials, there may be adopted, for example, a method in which one starting solution is added into the other starting solution, or a method in which both starting solutions are contacted together under predetermined certain conditions. According to a preferred method, the aqueous alkali silicate solution is poured under vigorous stirring into a predetermined amount of mineral acid, allowing both to react with each other. The neutralization temperature is not specially limited, but is usually not higher than 50° C. A suitable pH value at the end of the neutralization is in the range of 0 to 10.

Hydrosol of silica is produced by the neutralization and it is usually allowed to stand for 30 minutes or longer, and if necessary, the temperature and pH of the reaction product (hydrosol) are adjusted, for conversion into a hydrogel of silica.

The $SiO_2$ concentration of the hydrogel is usually as low as 5 to 30 wt %, but for the purpose of both pore adjustment and the adjustment of water content (increasing the $SiO_2$ concentration) of the hydrogel, it is desirable to heat-treat the hydrogel to the extent of 5% or more in terms of $SiO_2$ concentration. The temperature of this heat treatment is usually in the range of 100° to 170° C. and this treatment can be performed within an autoclave.

The silica hydrogel after the heat treatment is washed with water, then filtered if necessary, to afford a a solid hydrogel. The hydrogel is then pulverized coarsely to 20–100 µm in particle diameter, then made into a silica hydrosol slurry with an $SiO_2$ concentration of 15 to 25 wt %, followed by wet pulverization. It is desirable that such wet pulverization be conducted under a high-speed shear using an apparatus capable of effecting a high-speed shear, e.g. a friction inner-plate mill. Next, as mentioned above, the slurry is dried into a microsphere silica by means of a spray dryer, followed by further drying at about 200° C. to remove water, thereby affording a microsphere silica to be used in the invention. By changing the conditions for the wet pulverization and that for the spray drying it is made possible to produce silicas which satisfy the properties defined herein.

2) A sol having an $SiO_2/Na_2O$ (mole ratio) in the range from 60 to 130 is obtained by passing an aqueous sodium silicate solution through a cation exchange resin layer and it is then aged under heating until independent dispersed particles having a high density are formed, to which is then gradually added a dilute sol obtained through an ion exchange resin layer, allowing it to be deposited on the surfaces of the independent dispersed particles, thereby affording a stable sol.

In this case, NaOH, LiOH or KOH may be added as a stabilizer. The stable sol thus obtained is diluted to a suitable concentration and then spray-dried to obtain a microsphere silica, followed by further drying at about 200° C. to remove water. In this way there is obtained a microsphere silica to be used in the invention.

Of the two methods described above, the method 1) is preferred.

For the preparation of alumina, there may be adopted any of the following methods for example.

1) A basic aluminum sulfate is prepared by adding a carbonate to an aqueous aluminum sulfate solution and it is then added dropwise into oil at a predetermined speed. After the resulting sol is sphered by the surface tension, heating is performed to obtain alumina hydrogel. The spherical hydrogel is transferred from the oil layer into an aqueous layer for hydrolysis, followed by removal of sulfate ion, water-washing, drying and subsequent calcining at 500°–600° C. to afford a spherical alumina gel having a predetermined particle diameter.

2) Bauxite is extracted with caustic soda, followed by filtration to obtain sodium aluminate, which is then hydrolyzed into aluminum hydroxide, followed by pulverizing and calcining to afford alumina gel.

3) The aluminum hydroxide obtained as an intermediate product in the above method 2) or a highly aluminous clay mineral is reacted with sulfuric acid to obtain aluminum sulfate. Then, aluminum hydroxide is precipitated by neutralization with ammonia, followed by filtration, drying and calcining to afford alumina gel.

Of the three methods described above, the method 1) is preferred.

For the preparation of silica-alumina, there may be adopted, for example, either the following method 1) or 2):

1) Sulfuric acid is put into a mixer, then sodium silicate is added dropwise under stirring and cooling to give a silica sol having a pH value of 1 to 3. Separately, a basic aluminum sulfate sol is prepared by adding a calcium carbonate powder slowly into a stirred aqueous aluminum sulfate solution. 2–15 parts by volume of the basic aluminum sulfate sol is added and mixed into 100 parts by volume of the silica sol prepared above, then the resulting mixed sol is added dropwise into a heated organic solvent. At this time, the sol is sphered by the surface tension and then converted into a hydrogel. The thus-sphered hydrogel is washed with water to remove ions and then dried to afford a spherical silica-alumina gel.

2) Sodium silicate, sodium aluminate, silica gel and caustic soda are reacted and crystallized for several hours at 80°–120° C. and at suitable mole ratios of $Na_2O/SiO_2$, $SiO_2/Al_2O_3$, $H_2O/Na_2O$, followed by water-washing and drying.

Of the above two methods, the method 1) is preferred.

It is preferable that the metal oxide be further subjected to calcining at 200°–800° C. before its use as a solid catalyst component.

Among the silica, alumina and silica-alumina, silica is most preferred.

[2] Transition Metal Component (a)

A solid catalyst component for olefin polymerization employable in the present invention is one obtained by supporting at least magnesium, titanium and/or vanadium, and halogen on the specific metal oxide described above. More specifically, it is prepared by contacting at least a magnesium compound, a titanium compound and/or a vanadium compound, etc. with the specific metal oxide.

The said magnesium compound is not specially limited, but as an example there is mentioned a compound represented by the following general formula:

$$Mg(OR)_nX_{2-n}$$

where R is a hydrocarbon radical having 1 to 20 carbon atoms, X is a halogen atom and n is $0 \leq n \leq 2$. More concrete examples include magnesium fluoride, magnesium chloride, magnesium bromide, magnesium iodide, methoxychloromagnesium, ethoxychloromagnesium, n-propoxychloromagnesium, iso-propoxychloromagnesium, n-butoxychloromagnesium, sec-butoxychloromagnesium, tert-butoxychloromagnesium, methoxybromomagnesium, ethoxybromomagnesium, n-propoxybromomagnesium, iso-propoxybromomagnesium, n-butoxybromomagnesium, sec-butoxybromomagnesium, tert-butoxybromomagnesium, dimethoxymagnesium, diethoxymagnesium, di-n-propoxymagnesium, di-iso-propoxymagnesium, di-n-butoxymagnesium, di-sec-butoxymagnesium, di-tert-butoxymagnesium, with magnesium chloride being particularly preferred. These magnesium compounds may have been treated with electron donors such as, for example, alcohols, esters, ketones, carboxylic acids, ethers, amines or phosphines.

A compound obtained by reacting the above magnesium compound with a compound represented by the general formula:

$$Me(OR)_p X_{z-p}$$

wherein Me is an element of Groups I to IV in the Periodic Table, z is the valence of the element Me, p is $0 < p \leq z$, X is a halogen atom, and R is a hydrocarbon residue, preferably group, having 1 to 20, preferably 1 to 8, carbon atoms such as alkyl, aryl, or aralkyl, and R may be the same or different. There are mentioned compounds represented by NaOR, $Mg(OR)_2$, $Mg(OR)X$, $Ca(OR)_2$, $Zn(OR)_2$, $Cd(OR)_2$, $B(OR)_3$, $Al(OR)_3$, $Al(OR)_2X$, $Al(OR)X_2$, $Si(OR)_4$, $Si(OR)_3X$, $Si(OR)_2X_2$, $Si(OR)X_3$, and $Sn(OR)_4$. More concrete and preferred examples are $Mg(OC_2H_5)_2$, $Mg(OC_2H_5)Cl$, $Al(OCH_3)_3$, $Al(OC_2H_5)_3$, $Al(On-C_3H_7)_3$, $Al(Oi-C_3H_7)_3$, $Al(On-C_4H_9)_3$, $Al(Osec-C_4H_9)_3$, $Al(Ot-C_4H_9)_3$, $Al(OCH_3)_2Cl$, $Al(OC_2H_5)_2Cl$, $Al(OC_2H_5)Cl_2$, $Al(Oi-C_3H_7)_2Cl$, $Al(Oi-C_3H_7)Cl_2$, $Si(OC_2H_5)_4$, $Si(OC_2H_5)_3Cl$, $Si(OC_2H_5)_2Cl_2$, $Si(OC_2H_5)Cl_3$, $B(OCH_3)_3$, $B(OC_2H_5)_3$, $B(On-C_4H_9)_3$.

The above titanium compound is not specially limited but a titanium compound of the general formula $$Ti(OR^1)_m X_{4-m}$$

where $R_1$ is a hydrocarbon radical having 1 to 20, preferably 1 to 12, carbon atoms such as an alkyl, aryl or aralkyl group, X is a halogen atom, and n is $0 \leq m \leq 4$ is preferable. Examples include titanium tetrahalides such as titanium tetrachloride, titanium tetrabromide and titanium tetraiodide, monomethoxytrichlorotitanium, dimethoxydichlorotitanium, trimethoxymonochlorotitanium, tetramethoxytitanium, monoethoxytrichlorotitanium, monoethoxytrifluorotitanium, monoethoxytribromotitanium, diethoxydifluorotitanium, diethoxydichlorotitanium, diethoxydibromotitanium, triethoxyfluorotitanium, triethoxycholorotitanium, tetraethoxytitanium, monopropoxytrichlorotitanium, monoisopropoxytrichlorotitanium, dipropoxydichlorotitanium, diisopropoxydichlorotitanium, diisopropoxydibromotitanium, tripropoxyfluorotitanium, tripropoxychlorotitanium, tetra-n-propoxytitanium, tetraisopropoxytitanium, monobutoxytrichlorotitanium, monoisobutoxytrichlorotitanium, dibutoxydichlorotitanium, diisopropoxydichlorotitanium, tributoxyfluorotitanium, tributoxychlorotitanium, triisobutoxychlorotitanium, tetra-n-butoxytitanium, tetraisobutoxytitanium, tetra-sec-butoxytitanium, tetra-tert-butoxytitanium, monopentyloxytrichlorotitanium, dipentyloxydichlorotitanium, tripentyloxymonochlorotitanium, tetra-n-pentyloxytitanium, tetra-cyclopentyloxytitanium, monooctyloxytrichlorotitanium, dioctyloxydichlorotitanium, monooctyloxytrichlorotitanium, dioctyloxydichlorotitanium, trioctyloxymonochlorotitanium, tetra-n-hexyloxytitanium, tetra-cyclohexyloxytitanium, tetra-n-heptyloxytitanium, tetra-n-octyloxytitanium, mono-2-ethylhexyloxytrichlorotitanium, di-2-ethylhexyloxydichlorotitanium, tri-2-ethylhexyloxymonochlorotitanium, tetranonyloxytitanium, tetradecyloxytitanium, tetraisobornyloxytitanium, tetraoleyloxytitanium, tetraallyloxytitanium, tetrabenzyloxytitanium, tetrabenzhydryloxytitanium, monophenoxytrichlorotitanium, diphenoxydichlorotitanium, triphenoxychlorotitanium, tri-o-xylenoxychlorotitanium, tetraphenoxytitanium, tetra-o-methylphenoxytitanium, tetra-m-methylphenoxytitanium, tetra-1-naphthyloxytitanium, tetra-2-naphthyloxytitanium and mixtures thereof. Among them, particularly, titanium tetrachloride, monoethoxytrichlorotitanium, diethoxydichlorotitanium, monobutoxytrichlorotitanium, dibutoxydichlorotitanium, tetraethoxytitanium, tetraisopropoxytitanium, tetra-n-butoxytitanium, tetra-n-hexyloxytitanium, tetra-n-octyloxytitanium and tetra-2-ethylhexyloxytitanium are preferred.

As examples of the vanadium compound are mentioned tetravalent vanadium compounds such as vanadium tetrachloride, vanadium tetrabromide, vanadium tetraiodide, and tetraethoxyvanadium; pentavalent vanadium compounds such as vanadium oxytrichloride, ethoxydichlorovanadyl, triethoxyvanadyl, and tributoxyvanadyl; and trivalent vanadium compounds such as vanadium trichloride and vanadium triethoxide. The vanadium compound may be used alone or in combination with the titanium compound.

The above titanium compound and magnesium compound may be reacted in the presence of an organic compound such as alcohols, phenols, ether, ketones, esters, amines and nitriles as solvent or reactant. Alcohols are preferable.

Examples include methanol, ethanol, 1-propanol, 2-propanol, 1-butanol, 2-methyl-1-propanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, 1-hexanol, 2-methyl-1-pentanol, 4-methyl-1-pentanol, 4-methyl-2-pentanol, 2-ethyl-1-butanol, 1-heptanol, 2-pentanol, 3-heptanol, 4-heptanol, 2,4-dimethyl-3-pentanol, 1-octanol, 2-octanol, 2-ethyl-1-hexanol, 3,5-dimethyl-1-hexanol, 2,2,4-trimethyl-1-pentanol, 1-nonanol, 5-nonanol, 3,5-dimethyl-4-heptanol, 2,6-dimethyl-4-heptanol, 3,5,5-trimethyl-4-hexanol, 1-decanol, 1-undecanol, 1-dodecanol, 2,6,8-trimethyl-4-nonanol, 1-tridecanol, 1-pentadecanol, 1-hexadecanol, 1-heptadecanol, 1-octadecanol, 1-nonadecanol, 1-eicosanol, phenol, chlorophenol, benzyl alcohol, methyl cellosolve, and mixtures thereof. Particularly, 2-methyl-1-pentanol, 4-methyl-1-pentanol, 4-methyl-2-pentanol, 2-ethyl-1-butanol, 2,4-dimethyl-3-pentanol, 2-ethyl-1-hexanol, 3,5-dimethyl-1-hexanol, 2,2,4-trimethyl-1-pentanol, 3,5-dimethyl-4-heptanol, 2,6-dimethyl-4-heptanol, 3,5,5-trimethyl-4-hexanol, 1-decanol, 1-undecanol, 1-dodecanol, 2,6,8-trimethyl-4-nonanol, 1-tridecanol, 1-pentadecanol, 1-hexadecanol, 1-heptadecanol, 1-octadecanol, 1-nonadecanol, 1-eicosanol, phenol, chlorophenol, benzyl alcohol, methyl cellosolve, and mixtures thereof.

Preferable are 2-methyl-1-pentanol, 2-ethyl-1-butanol, 2,4-dimethyl-3-pentanol, 2-ethyl-1-hexanol, 3,5-dimethyl-1-hexanol, 2,2,4-trimethyl-1-pentanol, 3,5-dimethyl-4-heptanol, 2,6-dimethyl-4-heptanol, 3,5,5-trimethyl-4-hexanol and the like. It goes without saying that commercially available various alcohols such as methanol-modified alcohol and hexane-modified alcohol may also be used without any trouble.

There may be adopted a method wherein a silicon compound is further added to and reacted with the foregoing titanium compound and/or vanadium compound, magnesium compound, and silicon oxide and/or aluminum oxide. As an example of the said silicon compound there is mentioned a compound represented by the following general formula:

$$R^1_a R^2_b R^3_c R^4_d SiX_{4-(a+b+c+d)}$$

where $R^1$, $R^2$, $R^3$ and $R^4$, which may be the same or different are each hydrogen, a hydrocarbon radical, such as an alkyl, aryl or aralkyl having 1 to 20, preferably 1 to 12, carbon atoms or $-NR^5$ or $-OR^5$ where $R^5$ is hydrogen or a hydrocarbon radical, such as an alkyl, aryl or aralkyl radical, having 1 to 20, preferably 1 to 12, carbon atoms, X is a halogen atom such as fluorine, chlorine, bromine or iodine, and a, b, c and d satisfy the conditions of $0 \leq a < 4$, $0 \leq b < 4$, $0 \leq c < 4$, $0 \leq d < 4$, provided $0 \leq a+b+c+d \leq 4$, preferably $0 < a+b+c+d \leq 4$.

More concrete examples of such silicon compound include tetraethoxysilane, triethoxychlorosilane, diethoxydichlorosilane, ethoxytrichlorosilane, tetraphenoxysilane, triphenoxychlorosilane, diiphenoxydichlorosilane, phenoxytrichlorosilane, tetrabenzoxysilane, dimethyldimethoxysilane, dimethyldiethoxysilane, diethyldiethoxysilane, bis-dimethylaminodimethylsilane, methyldimethoxysilane, ethyldimethoxysilane, methyldiethoxysilane, ethyldiethoxysilane and silicon tetrachloride.

There also may be adopted a method wherein an organoaluminum compound is further added to and reacted with the foregoing titanium compound and/or vanadium compound, magnesium compound, and silicon oxide and/or aluminum oxide. As an example of such organoaluminum compound there is mentioned a compound represented by the following general formula:

$$R_n AlX_{3-n}$$

where R is hydrogen, a hydrocarbon radical, such as an alkyl, aryl or aralkyl radical, having 1 to 20, preferably 1 to 12, carbon atoms, or $-OR'$ where R' is hydrogen or a hydrocarbon radical, such as an alkyl, aryl or aralkyl radical, having 1 to 20, preferably 1 to 12, carbon atoms, X is a halogen atom such as fluorine, chlorine, bromine or iodine, and n is $0 \leq n < 3$, provided when n is larger than 1, Rs may be the same or different.

More concrete examples of such organoaluminum compound include trimethylaluminum, triethylaluminum, triisobutylaluminum, trihexylaluminum, diethylaluminum chloride, ethylaluminum sesquichloride and ethylaluminum dichloride.

How to prepare the solid catalyst component containing the transition metal component (a) as an essential ingredient is not specially limited. For example, there may be adopted a method wherein the titanium compound, magnesium compound, etc. are co-pulverized at a temperature of 0° to 200° C. for 30 minutes to 50 hours, using a ball mill, vibration mill, rod mill or impact mill, or a method wherein the titanium compound, magnesium compound, etc. are mixed and reacted under heating in an organic solvent such as an inert hydrocarbon, alcohol, phenol, ether, ketone, ester, amine or nitrile at a temperature of 0° to 400° C., preferably 20° to 300° C., for 5 minutes to 10 hours, and thereafter the solvent is removed by evaporation.

As to the reaction ratio of components, no special limitation is placed thereon. For example, the Ti/Mg mole ratio is in the range from 0.001 to 1,000, preferably 0.01 to 100, more preferably 0.05 to 10.

Examples of these solid catalyst components include those disclosed in JP63-63561B, JP63-63681B, JP1-10528B, JP1-11651B, JP1-12286B, JP1-12289B, JP1-35846B, JP1-35844B, JP1-35845B, JP60-149605A, JP62-31105A, JP61-207306A, JP63-61008A, JP3-35004A, JP3-64306A, JP3-153707A, JP3-185004A, JP3-252407, JP3-121103A, JP4-261408A and like.

The above solid catalyst component is used together with an organometallic compound of Group I to IV in the Periodic Table as a so-called Ziegler type catalyst. Especially, an organoaluminum compound and organozinc compound are preferable.

To illustrate these compounds, mention may be made of organoaluminum compounds of the general formulae $R_3Al$, $R_2AlX$, $RAlX_2$, $R_2AlOR$, $RAl(OR)X$ and $R_3Al_2X_3$ wherein R, which may be the same or different, is an alkyl or aryl group having 1 to 20 carbon atoms and X is a halogen atom, as well as organozinc compounds of the general formula $R_2Zn$, wherein R, which may be the same or different, is an alkyl group having 1 to 20 carbon atoms.

Concrete examples are triethylaluminum, triisopropylaluminum, triisobutylaluminum, tri-sec-butylaluminum, tri-tert-butylaluminum, trihexylaluminum, trioxtylaluminum, diethylaluminum chloride, diisopropylaluminum chloride, diethylaluminum ethoxide, ethylaluminum sesquichloride, diethylzinc, and mixtures thereof.

The amount of the organometallic compound used is not specially limited. But usually it is in the range of 0.1 to 1,000 moles per mole of the titanium compound.

It is also preferable in the present invention that the organometallic compound component be used as a mixture or addition compound of the organometallic compound and an organic acid ester.

Where the organometallic compound component is used as a mixture of the organometallic compound and an organic acid ester, the organic acid ester is used usually in an amount of 0.1 to 1 mole, preferably 0.2 to 0.5 mole, per mole of the organometallic compound. Where it is used as an addition compound of the organometallic compound and the organic acid ester, the molar ratio is preferably in the range of 2:1 to 1:2.

The organic acid ester is the ester of a saturated or unsaturated, mono- or dibasic organic carboxylic acid having 1 to 24 carbon atoms and an alcohol having 1 to 30 carbon atoms. Examples are methyl formate, ethyl acetate, amyl acetate, phenyl acetate, octyl acetate, methyl methacrylate, ethyl stearate, methyl benzoate, ethyl benzoate, n-propyl benzoate, iso-propyl benzoate, butyl benzoate, hexyl benzoate, cyclopentyl benzoate, cyclohexyl benzoate, phenyl benzoate, benzoic acid-4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinol carboxylate, methyl anisate, methyl p-ethoxybenzoate, methyl p-toluylate, ethyl p-toluylate, pheyl p-toluylate, ethyl o-toluylate, ethyl m-toluylate, methyl p-aminobenzoate, ethyl p-aminobenzoate, vinyl benzoate, allyl benzoate, benzyl benzoate, methyl naphthoate, and ethyl naphthoate.

Particularly preferred are alkyl esters, especially methyl esters and ethyl esters, of benzoic acid, o- or p-toluic acid and anisic acid.

[3] Transition Metal Component (b)

Another solid catalyst component for olefin polymerization employable in the present invention is one obtained by contacting the foregoing specific metal oxide with a compound (component (1)) of the general formula $Me^1R^1_n X^1_{4-n}$, a compound (component (2)) of the general formula $Me^2R^2_mX^2_{z-m}$ and an organocyclic compound (component (3)) having two or more conjugated double bonds.

First, the component (1) will now be described. In the general formula $Me^1R^1_nX^1_{4-n}$ of component (1), $R^1$ is a hydrocarbon radical having 1 to 24, preferably 1 to 12, more preferably 1 to 8, carbon atoms. As examples of such a hydrocarbon radical there are mentioned such alkyl radicals as methyl, ethyl propyl, butyl, pentyl, hexyl and octyl, such alkenyl radicals as vinyl and allyl, such aryl radicals as phenyl, tolyl and xylyl, such aralkyl radicals as benzyl, phenethyl, styryl and neophyl, as well as oxygen-containing hydrocarbon radicals such as alkoxy radicals e.g. methoxy, ethoxy, propoxy, butoxy and pentyloxy, aryloxy radicals, e.g. phenoxy and tolyloxy, and benzyloxy. In the same general formula, $X^1$ is a halogen atom such as fluorine, iodine, chlorine or bromine, $Me^1$ is Zr, Ti or Hf, preferably Zr, and n is $0 \leq n \leq 4$, preferably $0 < n \leq 4$.

Examples of the compound represented by the above general formula include tetramethyl zirconium, tetraethyl zirconium, tetrapropyl zirconium, tetra-n-butyl zirconium, tetrapentyl zirconium, tetraphenyl zirconium, tetratolyl zirconium, tetrabenzyl zirconium, tetramethoxy zirconium, tetraethoxy zirconium, tetrapropoxy zirconium, tetrabutoxy zirconium, tetraphenoxy zirconium, tetratolyloxy zirconium, tetrapentyloxy zirconium, tetrabenzyloxy zirconium, tetraallyl zirconium, tetraneophyl zirconium, trimethylmonochloro zirconium, triethylmonochloro zirconium, tripropylmonochloro zirconium, tri-n-butylmonochloro zirconium, tribenzylmonochloro zirconium, dimethyldichloro zirconium, diethyldichloro zirconium, di-n-butyldichloro zirconium, dibenzyldichloro zirconium, monomethyltrichloro zirconium, monoethyltrichloro zirconium, mono-n-butyltrichloro zirconium, monobenzyltrichloro zirconium, tetrachloro zirconium, trimethoxymonochloro zirconium, dimethoxydichloro zirconium, monomethoxytrichloro zirconium, tetraethoxy zirconium, triethoxymonochloro zirconium, diethoxydichloro zirconium, monoethoxytrichloro zirconium, triisopropoxymonochloro zirconium, diisopropoxydichloro zirconium, monoisopropoxytrichloro zirconium, tetra-n-butoxy zirconium, tri-n-butoxymonochloro zirconium, di-n-butoxydichloro zirconium, mono-n-butoxytrichloro zirconium, tripentoxymonochloro zirconium, dipentoxyldichloro zirconium, monopentoxytrichloro zirconium, triphenoxymonochloro zirconium, diphenoxydichloro zirconium, monophenoxytrichloro zirconium, tritolyloxymonochloro zirconium, ditolyloxydichloro zirconium, monotolyloxytrichloro zirconium, tribenzyloxymonochloro zirconium, dibenzyloxydichloro zirconium, monobenzyloxytrichloro zirconium, trimethylmonobromo zirconium, triethylmonobromo zirconium, tripropyl-monobromo zirconium, tri-n-butylmonobromo zirconium, tribenzylmonobromo zirconium, dimethyldibromo zirconium, diethyldibromo zirconium, di-n-butyldibromo zirconium, dibenzyldibromo zirconium, monomethyltribromo zirconium, monoethyltribromo zirconium, mono-n-butyltribromo zirconium, monobenzyltribromo zirconium, tetrabromo zirconium, trimethoxymonobromo zirconium, dimethoxydibromo zirconium, monomethoxytribromo zirconium, triethoxymonobromo zirconium, diethoxydibromo zirconium, monoethoxytribromo zirconium, mono-n-butyltribromo zirconium, monobenzyltribromo zirconium, tetrabromo zirconium, trimethoxymonobromo zirconium, dimethoxydibromo zirconium, monomethoxytribromo zirconium, triethoxymonobromo zirconium, monoethoxytribromo zirconium, triisopropoxymonobromo zirconium, diisopropoxydibromo zirconium, monoisopropoxytribromo zirconium, tri-n-butoxymonobromo zirconium, di-n-butoxydibromo zirconium, mono-n-butoxytribromo zirconium, tripentoxymonobromo zirconium, dipentoxydibromo zirconium, monopentoxytribromo zirconium, triphenoxymonobromo zirconium, diphenoxydibromo zirconium, monophenoxytribromo zirconium, tritolyloxymonobromo zirconium, ditolyloxydibromo zirconium, monotolyloxytribromo zirconium, tribenzyloxymonobromo zirconium, dibenzyloxydibromo zirconium, monobenzyloxytribromo zirconium, trimethylmonoiodo zirconium, triethylmonoiodo zirconium, tripropylmonoiodo zirconium, tri-n-butylmonoiodo zirconium, tribenzylmonoiodo zirconium, dimethyldiiodo zirconium, diethyldiiodo zirconium, di-n-butyldiiodo zirconium, dibenzyldiiodo zirconium, monomethyltriiodo zirconium, monoethyltriiodo zirconium, mono-n-butyltriiodo zirconium, monobenzyltriiodo zirconium, tetraiodo zirconium, trimethoxymonoiodo zirconium, dimethoxymonoiodo zirconium, monomethoxytriiodo zirconium, triethoxydiiodo zirconium, diethoxydiiodo zirconium, monoethoxytriiodo zirconium, triisopropoxymonoiodo zirconium, diisopropoxydiiodo zirconium, monoisopropoxytriiodo zirconium, tri-n-butoxymonoiodo zirconium, di-n-butoxydiiodo zirconium, mono-n-butoxytriiodo zirconium, tripentoxymonoiodo zirconium, dipentoxydiiodo zirconium, monopentoxytriiodo zirconium, triphenoxymonoiodo zirconium, diphenoxydiiodo zirconium, monophenoxytriiodo zirconium, tritolyloxymonoiodo zirconium, ditolyloxydiiodo zirconium, monotolyloxytriiodo zirconium, tribenzyloxymonoiodo zirconium, dibenzyloxydiiodo zirconium, monobenzyloxytriiodo zirconium, tribenzylmonomethoxy zirconium, tribenzylmonoethoxy zirconium, tribenzylmonopropoxy zirconium, tribenzylmonobutoxy zirconium, tribenzylmonophenoxy zirconium, dibenzyldimethoxy zirconium, dibenzyldiethoxy zirconium, dibenzyldipropoxy zirconium, dibenzyldibutoxy zirconium, dibenzyldiphenoxy zirconium, monobenzyltrimethoxy zirconium, monobenzyltriethoxy zirconium, monobenzyltripropoxy zirconium, monobenzyltributoxy zirconium, monobenzyltriphenoxy zirconium, trineophylmonomethoxy zirconium, trineophylmonoethoxy zirconium, trineophylmonopropoxy zirconium, trineophylmonobutoxy zirconium, trineophylmonophenoxy zirconium, dineophyldimethoxy zirconium, dineophyldiethoxy zirconium, dineophyldipropoxy zirconium, dineophyldibutoxy zirconium, dineophyldiphenoxy zirconium, mononeophyltrimethoxy zirconium, mononeophyltriethoxy zirconium, mononeophyltripropoxy zirconium, mononeophyltributoxy zirconium, mononeophyltriphenoxy zirconium, tetramethyl titanium, tetraethyl titanium, tetrapropyl titanium, tetra-n-butyl titanium, tetrapentyl titanium, tetraphenyl titanium, tetratolyl titanium, tetrabenzyl titanium, tetramethoxy titanium, tetraethoxy titanium, tetrapropoxy titanium, tetrabutoxy titanium, tetraphenoxy titanium, tetratolyloxy titanium, tetrapentyloxy titanium, tetrabenzyloxy titanium, tetraallyl titanium, tetraneophyl titanium, trimethylmonochloro titanium, triethylmonochloro titanium, tripropylmonochloro titanium, tri-n-butylmonochloro titanium, tribenzylmonochloro titanium, dimethyldichloro titanium, diethyldichloro titanium, di-n-butyldichloro titanium, dibenzyldichloro titanium, monomethyltrichloro titanium, monoethyltrichloro titanium, mono-n-butyltrichloro titanium, monobenzyltrichloro titanium, tetrachloro titanium, trimethoxymonochloro titanium, dimethoxydichloro titanium, diethoxydichloro titanium, monomethoxytrichloro titanium, tetraethoxy titanium, tetraethoxymonocloro titanium, diethoxydichloro titanium, monoethoxytrichloro titanium, triisopropoxymonochloro titanium, diisopropoxydichloro titanium, monoisopropoxytrichloro titanium, tetra-n-butoxy titanium, tri-n-butoxymonochloro titanium, di-n-butoxydichloro titanium, mono-n-butoxytrichloro titanium, tripentoxymonochloro titanium, dipentoxydichloro titanium, monopentoxytrichloro titanium, triphenoxymonochloro titanium, diphenoxydichloro titanium, monophenoxytrichloro titanium, tritolyloxymonochloro titanium, ditolyloxydichloro titanium, monotolyloxytrichloro titanium, tribenzyloxymonochloro titanium, dibenzyloxydichloro titanium, monobenzyloxytrichloro titanium, triethylmonobromo titanium, tripropylmonobromo titanium, tri-n-butylmonobromo titanium, tribenzylmonobromo titanium, dimethyldibromo titanium, diethyldibromo titanium, di-n-butyldibromo titanium, dibenzyldibromo titanium, monomethyltribromo titanium, monoethyltribromo titanium, mono-n-butyltribromo titanium, monobenzyltribromo titanium, tetrabromo titanium, trimethoxymonobromo titanium, dimethoxydibromo titanium, monomethoxytribromo titanium, triethoxymonobromo titanium, diethoxydibromo titanium, monoethoxytribromo titanium, triisopropoxymonobromo titanium, diisopropoxydibromo titanium, monoisopropoxytribromo titanium, tri-n-butoxymonobromo titanium, di-n-butoxydibromo titanium, mono-n-butoxytribromo titanium, tripentoxymonobromo titanium, dipentoxydibromo titanium, monopentoxytribromo titanium, triphenoxymonobromo titanium, diphenoxydibromo titanium, monophenoxytribromo titanium, tritolyloxymonobromo titanium, ditolyloxydibromo titanium, monotolyloxytribromo titanium, tribenzyloxymonobromo titanium, dibenzyloxydibromo titanium, monobenzyloxytribromo titanium, trimethylmonoiodo titanium, triethylmonoiodo titanium, tripropylmonoiodo titanium, tri-n-butylmonoiodo titanium, tribenzylmonoiodo titanium, dimethyldiiodo titanium, diethyldiiodo titanium, di-n-butyldiiodo titanium, dibenzyldiiodo titanium, monomethyltriiodo titanium, monoethyltriiodo titanium, mono-n-butyltriiodo titanium, monobenzyltriiodo titanium, tetraiodo titanium trimethoxymonoiodo titanium, dimethoxydiiodo titanium, monomethoxytrifodo titanium, triethoxymonoiodo titanium, diethoxydiiodo titanium, monoethoxytriiodo titanium, triisopropoxymonoiodo titanium, diisopropoxydiiodo titanium, monoisopropoxytriiodo titanium, tri-n-butoxymonoiodo titanium, di-n-butoxydiiodo titanium, mono-n-butoxytriiodo titanium, tripentoxymonoiodo titanium, dipentoxydiiodo titanium, monopentoxytriiodo titanium, triphenoxymonoiodo titanium, diphenoxydiiodo titanium, monophenoxytriiodo titanium, tritolyloxylnonoiodo titanium, ditolyloxydiiodo titanium, monotolyloxytriiodo titanium, tribenzyloxymonoiodo titanium, dibenzyloxydiiodo titanium, monobenzyloxytriiodo titanium, tribenzylmonomethoxy titanium, tribenzylmonoethoxy titanium, tribenzylmonopropoxy titanium, tribenzylmonobentoxy titanium, tribenzylmonophenoxy titanium, dibenzyldimethoxy titanium, dibenzyldiethoxy titanium, dibenzyldipropoxy titanium, dibenzyldibutoxy titanium, dibenzyldiphenoxy titanium, monobenzyltriethoxy titanium, monobenzyltrimethoxy titanium, monobenzyltributoxy titanium, monobenzyltripropoxy titanium, monobenzyltriphenoxy titanium, trineophylmonomethoxy titanium, trineophylmonoethoxy titanium, trineophylmonobutoxy titanium, trineophylmonophenoxy titanium, dineophyldimethoxy titanium, dineophyldiethoxy titanium, dineophyldipropoxy titanium, dineophyldibutoxy titanium, dineophyldiphenoxy titanium, mononeophyltrimethoxy titanium, mononeophyltriethoxy titanium, mononeophyltripropoxy titanium, mononeophyltributoxy titanium, mononeophyltriphenoxy titanium, tetramethyl hafnium, tetraethyl hafnium, tetrapropyl hafnium, tetra-n-butyl hafnium, tetrapentyl hafnium, tetraphenyl hafnium, tetratolyl hafnium, tetrabenzyl hafnium, tetraethoxy hafnium, tetraethoxy hafnium, tetrapropoxy hafnium, tetrabutoxy hafnium, tetraphenoxy hafnium, tetratolyloxy hafnium, tetrapentyloxy hafnium, tetrabenzyloxy hafnium, tetraallyl hafnium, tetraneophyl hafnium, trimethylmonochloro hafnium, triethylmonochloro hafnium, tripropylmonochloro hafnium, tri-n-butylmonochloro hafnium, tribenzylmonochloro hafnium, dimethyldichloro hafnium, diethyldichloro hafnium, di-n-butyldichloro hafnium, dibenzyldichloro hafnium, monomethyltrichloro hafnium, monoethyltrichloro hafnium, mono-n-butyltrichloro hafnium, monobenzyltrichloro hafnium, tetrachloro hafnium, trimethoxymonochloro hafnium, dimethoxydichloro hafnium, diethoxydichloro hafnium, monomethoxytrichloro hafnium, tetraethoxy hafnium, triethoxymonocloro hafnium, diethoxydichloro hafnium, monoethoxytrichloro hafnium, triisopropoxymonochloro hafnium, diisopropoxydichloro hafnium, monoisopropoxytrichloro hafnium, tetra-n-butoxy hafnium, tri-n-butoxymonochloro hafnium, di-n-butoxydichloro hafnium, mono-n-butoxytrichloro hafnium, tripentoxymonochloro hafnium, dipentoxydichloro hafnium, monopentoxytrichloro hafnium, triphenoxymonochloro hafnium, diphenoxydichloro hafnium, monophenoxytrichloro hafnium, tritolyloxymonochloro hafnium, ditolyloxydichloro hafnium, monotolyloxytrichloro hafnium, tribenzyloxymonochloro hafnium, dibenzyloxydichloro hafnium, monobenzyloxytrichloro hafnium, trimethylmonobromo hafnium, triethylmonobromo hafnium, tripropylmonobromo hafnium, tri-n-butylmonobromo hafnium, tribenzylmonobromo hafnium, dimethyldibromo hafnium, diethyldibromo hafnium, di-n-butyldibromo hafnium, dibenzyldibromo hafnium, monomethyltribromo hafnium, monoethyltribromo hafnium, mono-n-butyltribromo hafnium, monobenzyltribromo hafnium, tetrabromo hafnium, trimethoxymonobromo hafnium, dimethoxydibromo hafnium, monomethoxytribromo hafnium, triethoxymonobromo hafnium, diethoxydibromo hafnium, monoethoxytribromo hafnium, triisopropoxymonobromo hafnium, diisopropoxydibromo hafnium, monoisopropoxytribromo hafnium, tri-n-butoxymonobromo hafnium, di-n-butoxydibromo hafnium, mono-n-butoxytribromo hafnium, tripentoxymonobromo hafnium, dipentoxydibromo hafnium, monopentoxytribromo hafnium, triphenoxymonobromo hafnium, diphenoxydibromo hafnium, monophenoxytribromo hafnium, tritolyloxymonobromo hafnium, ditolyloxydibromo hafnium, monotolyloxytribromo hafnium, tribenzyloxymonobromo hafnium, dibenzyloxydibromo hafnium, monobenzyloxytribromo hafnium, trimethylmonoiodo hafnium, triethylmonoiodo hafnium, tripropylmonoiodo hafnium, tri-n-butylmonoiodo hafnium, tribenzylmonoiodo hafnium, dimethyldiiodo hafnium, diethyldiiodo hafnium, di-n-butyldiiodo hafnium, dibenzyldiiodo hafnium, monomethyltriiodo hafnium, monoethyltriiodo hafnium, mono-n-butyltriiodo hafnium, monobenzyltriiodo hafnium, tetraiodo hafnium, trimethoxymonoiodo hafnium, dimethoxydiiodo hafnium, monomethoxytriiodo hafnium, triethoxymonoiodo hafnium, diethoxydiiodo hafnium, monoethoxytriiodo hafnium, triisopropoxymonoiodo hafnium, diisopropoxydiiodo hafnium, monoisopropoxytriiodo hafnium, tri-n-butoxymonoiodo hafnium, di-n-butoxydiiodo hafnium, mono-n-butoxytriiodo hafnium, tripentoxymonoiodo hafnium, dipentoxydiiodo hafnium, monopentoxytriiodo hafnium, triphenoxymonoiodo hafnium, diphenoxydiiodo hafnium, monophenoxytriiodo hafnium, tritolyloxymonoiodo hafnium, ditolyloxydiiodo hafnium, monotolyloxytriiodo hafnium, tribenzyloxymonoiodo hafnium, dibenzyloxydiiodo hafnium, monobenzyloxytriiodo hafnium, tribenzylmonomethoxy hafnium, tribenzylmonoethoxy hafnium, tribenzylmonopropoxy hafnium, tribenzylmonobentoxy hafnium, tribenzylmonophenoxy hafnium, dibenzyldimethoxy hafnium, dibenzyldiethoxy hafnium, dibenzyldipropoxy hafnium, dibenzyldibutoxy hafnium, dibenzyldiphenoxy hafnium, monobenzyltrimethoxy hafnium, monobenzyltriethoxy hafnium, monobenzyltripropoxy hafnium, monobenzyltributoxy hafnium, monobenzyltriphenoxy hafnium, trineophylmonomethoxy hafnium, trineophylmonoethoxy hafnium, trineophylmonobutoxy hafnium, trineophylmonophenoxy hafnium, dineophyldimethoxy hafnium, dineophyldiethoxy hafnium, dineophyldipropoxy hafnium, dineophyldibutoxy hafnium, dineophyldiphenoxy hafnium, mononeophyltrimethoxy hafnium, mononeophyltriethoxy mononeophyltripropoxy hafnium, mononeophyltributoxy hafnium, mononeophyltriphenoxy hafnium, trimethoxy (trimethylsilyl) hafnium, triethoxy (trimethylsilylmethyl) hafnium, tripropoxy (trimethylsilylmethyl) hafnium, tributoxy (trimethylsilylmethyl) hafnium and the like.

Of course, $R^1$ in the above general formula may be various structural isomer groups such as iso-, s-, t- and neo- in addition to n-. Particularly, tetramethyl zirconium, tetraethyl zirconium, tetrabenzyl zirconium, tetrapropoxymonochloro zirconium, tetrabutoxy zirconium, tetrabutoxy titanium and tetrabutoxy hafnium are preferable.

More preferred are compounds having the formula $Zr(OR)_4$. These may be used as a mixture of two or more.

In the general formula $Me^2R^2_mX^2_{z-m}$ of component (2), $R^2$ is a hydrocarbon radical having 1 to 24, preferably 1 to 12, more preferably 1 to 8, carbon atoms. As examples of such a hydrocarbon radical there are mentioned such alkyl radicals as methyl, ethyl, propyl, isopropyl, butyl, pentyl, hexyl, octyl, decyl and dodecyl, such alkenyl radicals as vinyl and allyl, such aryl radicals as phenyl, tolyl and xylyl, such aralkyl radicals as benzyl, phenethyl, styryl and neophyl, as well as oxygen-containing hydrocarbon radicals such as alkoxy radicals, e.g. methoxy, ethoxy, propoxy, butoxy and pentyloxy, aryloxy radicals, e.g. phenoxy and tolyloxy, and aralkyloxy radicals, e.g. benzyloxy.

In the same general formula, $X^2$ is a halogen atom such as fluorine, iodine, chlorine or bromine; $Me^2$ is a Group I–III element of the Periodic Table such as, for example, lithium, sodium, potassium, magnesium, calcium, zinc, boron or aluminum; z is the valence of Me, which is usually in the range of 1 to 3; and m is $0<m\leq z$, preparably $0<m<z$ ($z=1$).

Examples of the compound represented by this general formula include methyl lithium, ethyl lithium, n-propyl lithium, isopropyl lithium, n-butyl lithium, t-butyl lithium, pentyl lithium, octyl lithium, phenyl lithium, benzyl lithium, dimethyl magnesium, diethyl magnesium, di-n-propyl magnesium, diisopropyl magnesium, di-n-butyl magnesium, di-t-butyl magnesium, dipentyl magnesium, dioctyl magnesium, diphenyl magnesium, dibenzyl magnesium, methyl magnesium chloride, ethyl magnesium chloride, n-propyl magnesium chloride, isopropyl magnesium chloride, n-butyl magnesium chloride, t-butyl magnesium chloride, pentyl magnesium chloride, octyl magnesium chloride, phenyl magnesium chloride, benzyl magnesium chloride, methyl magnesium bromide, methyl magnesium iodide, ethyl magnesium bromide, ethyl magnesium iodide, n-propyl magnesium bromide, n-propyl magnesium iodide, isopropyl magnesium bromide, isopropyl magnesium iodide, n-butyl magnesium bromide, n-butyl magnesium iodide, t-butyl magnesium bromide, t-butyl magnesium iodide, pentyl magnesium bromide, pentyl magnesium iodide, octyl magnesium bromide, octyl magnesium iodide, phenyl magnesium bromide, phenyl magnesium iodide, benzyl magnesium bromide, benzyl magnesium iodide, dimethyl zinc, diethyl zinc, di-n-propyl zinc, diisopropyl zinc, di-n-butyl zinc, di-t-butyl zinc, dipentyl zinc, dioctyl zinc, diphenyl zinc, dibenzyl zinc, trimethyl boron, triethyl boron, tri-n-propyl boron, triisopropyl boron, tri-n-butyl boron, tri-t-butyl boron, tripentyl boron, trioctyl boron, triphenyl boron, tribenzyl boron, trimethyl aluminum, triethyl aluminum, diethyl aluminum chloride, diethyl aluminum bromide, diethyl aluminum fluoxide, diethyl aluminum iodide, ethyl aluminum dichloride, ethyl aluminum dibromide, ethyl aluminum difluoxide, ethyl aluminum diiodide, tripropyl aluminum, dipropyl aluminum chloride, dipropyl aluminum bromide, dipropyl aluminum fluoxide, dipropyl aluminum iodide, propyl aluminum dichloride, propyl aluminum dibromide, propyl aluminum difluoride, propyl aluminum diiodide, triisopropyl aluminum, diisopropyl aluminum chloride, diisopropyl aluminum bromide, diisopropyl aluminum fluoride, diisopropyl aluminum iodide, ethyl aluminum sesquichloride, ethyl aluminum sesquibromide, propyl aluminum sesquichloride, propyl aluminum sesquibromide, n-butyl aluminum sesquichloride, n-butyl aluminum sesquibromide, isopropyl aluminum dichloride, isopropyl aluminum dibromide, isopropyl aluminum difluoide, isopropyl aluminum diiodide, tributyl aluminum, dibutyl aluminum chloride, dibutyl aluminum bromide, dibutyl aluminum fluolde, dibutyl aluminum iodide, butyl aluminum dichloride, butyl aluminum dibromide, butyl aluminum difluoride, butyl aluminum diiodide, tri-sec-butyl aluminum, di-sec-butyl aluminum chloride, di-sec-butyl aluminum bromide, di-sec-butyl aluminum fluoride, di-sec-butyl aluminum iodide, sec-butyl aluminum, dichloride, sec-butyl aluminum dibromide, sec-butyl aluminum difluoride, sec-butyl aluminum diiodide, tri-t-butyl aluminum, di-t-butyl aluminum chloride, di-t-butyl aluminum bromide, di-t-butyl aluminum fluoride, di-t-butyl aluminum iodide, t-butyl aluminum dichloride, t-butyl aluminum dibromide, t-butyl aluminum difluoride, t-butyl aluminum diiodide, triisobutyl aluminum, diisobutyl aluminum chloride, diisobutyl aluminum bromide, diisobutyl aluminum fluoide, diisobutyl aluminum iodide, isobutyl aluminum dichloride, isobutyl aluminum dibromide, isobutyl aluminum difluoide, isobutyl aluminum diiodide, trihexyl aluminum, dihexyl aluminum chloride, dihexyl aluminum bromide, dihexyl aluminum fluoxide, dihexyl aluminum iodide, hexyl aluminum dichloride, hexyl aluminum dibromide, hexyl aluminum difluoxide, hexyl aluminum diiodide, tripentyl aluminum, dipentyl aluminum chloride, dipentyl aluminum bromide, dipentyl aluminum fluoxide, dipentyl aluminum iodide, pentyl aluminum dichloride, pentyl aluminum dibromide, pentyl aluminum difluoride, pentyl aluminum diiodide, methyl aluminum methoxide, methyl aluminum ethoxide, methyl aluminum propoxide, methyl aluminum butoxide, dimethyl aluminum methoxide, dimethyl aluminum ethoxide, dimethyl aluminum propoxide, dimethyl aluminum butoxide, ethyl aluminum methoxide, ethyl aluminum ethoxide, ethyl aluminum propoxide, ethyl aluminum butoxide, diethyl aluminum methoxide, diethyl aluminum ethoxide, diethyl aluminum propoxide, diethyl aluminum butoxide, propyl aluminum methoxide, propyl aluminum ethoxide, propyl aluminum propoxide, propyl aluminum butoxide, dipropyl aluminum methoxide, dipropyl aluminum ethoxide, dipropyl aluminum propoxide, dipropyl aluminum butoxide, butyl aluminum methoxide, butyl aluminum ethoxide, butyl aluminum propoxide, butyl aluminum butoxide, dibutyl aluminum methoxide, dibutyl aluminum ethoxide, dibutyl aluminum propoxide, dibutyl aluminum butoxide, Of course, these compounds include structural isomers wherein $R^2$ is not only n- but also iso-, s-, t-, neo- or the like.

As component (3) there is used an organocyclic compound having two or more conjugated double bonds. As examples thereof are included cyclic hydrocarbons having two or more, preferably 2 to 4, more preferably 2 to 3, conjugated double bonds and a total number of carbon atoms of 4 to 24, preferably 4 to 12; cyclic hydrocarbons obtained by substituting the said cyclic hydrocarbons partially with 1 to 6 hydrocarbon radicals (typically alkyl or aralkyl groups having 1 to 12 carbon atoms); organosilicon compounds having two or more, preferably 2 to 4, more preferably 2 to 3, conjugated double bonds and having a cyclic hydrocarbon radical which has a total number of carbon atoms of 4 to 24, preferably 4 to 12; organosilicon compounds having the said cyclic hydrocarbon group substituted partially with 1 to 6 hydrocarbon radicals; and alkali metal salts (e.g. sodium salts or lithium salts) of these compounds.

The organosilicon compounds having such cyclic hydrocarbon group can be expressed by the following general formula:

$$(Cp)_m SiR_n X_{4-m-n}$$

where Cp represents the above cyclic hydrocarbon group examples of which are cyclopentadienyl, substituted cyclopentadienyl, indenyl and substituted indenyl; R is a hydrocarbon group having 1 to 24, preferably 1 to 12, carbon atoms, examples of which are alkyl groups such as methyl, ethyl, propyl, isopropyl, butyl, t-butyl, hexyl and octyl, alkoxy groups such as methoxy, ethoxy, propoxy and butoxy, aryl groups such as phenyl, aryloxy groups such as phenoxy, and aralkyl groups such as benzyl, or hydrogen, X represents a halogen atom such as fluoro, iodo, chloro or bromo, m and are $0<m\leq4$, $0\leq n\leq3$.

As examples of organocyclic hydrocarbons employable as component (3) there are mentioned cyclopentadiene, substituted cyclopentadienes such as methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, and pentamethylcyclopentadiene, indene, substituted indenes such as 4-methyl-1-indene, 4,7-dimethylindene, and 4,5,6,7-tetrahydroindene, cyclopolyenes or substituted cyclopolyenes, having 7 to 24 carbon atoms, such as cycloheptatriene, methylcycloheptatriene, cyclooctatetraene, methylcyclooctatetraene, azulene, methylazulene, ethylazulene, fluorene and methylfluorene, monocyclopentadienylsilane, dicyclopentadienylsilane, tricyclopentadienylsilane, tetracyclopentadienylsilane, monocyclopentadienylmonomethylsilane, monocyclopentadienylmonoethylsilane, monocyclopentadienyldimethylsilane, monocyclopentadienyldiethylsilane, monocyclopentadienyltrimethylsilane, monocyclopentadienyltriethylsilane, monocyclopentadienylmonomethoxysilane monocyclopentadienylmonoethoxysilane monocyclopentadienylmonophenoxysilane dicyclopentadienylmonomethylsilane, dicyclopentadienylmonoethylsilane, dicyclopentadienyldimethylsilane, dicyclopentadienyldiethylsilane, dicyclopentadienylmethylethylsilane, dicyclopentadienyldipropylsilane, dicyclopentadienylethylpropyisilane, dicyclopentadienyldiphenylsilane, dicyclopentadienylphenylinethyisilane dicyclopentadienylmonomethoxysilane, dicyclopentadienylmonoethoxysilane, tricyclopentadienylmonomethylsilane, tricyclopentadienylmonoethylsilane, tricyclopentadienylmonomethoxysilane tricyclopentadienylmonoethoxysilane, 3-methylcyclopentadienylsilane, bis-3-methylcyclopentadienylsilane, 3-methylcyclopentadienylmethylsilane 1,2-dimethylcyclopentadienylsilane, 1,3-dimethylcyclopentadienylsilane, 1,2,4-trimethylcyclopentadienylsilane 1,2,3,4-tetramethylcyclopentadienylsilane, pentamethylcyclopentadienylsilane, monoindenylsilane, diindenylsilane, triindenylsilane, tetraindenylsilane, monoindenylmonomethylsilane, monoindenylmonoethylsilane, monoindenyldimethylsilane, monocyindenyldiethylsilane, monocyindenyltrimethylsilane, monoindenyltriethylsilane, monoindenylmonomethoxysilane, monoindenylmonoethoxysilane, monoindenylmonophenoxysilane, monoindenylmonomethylsilane, diindenylmonoethylsilane, diindenyldimethylsilane, diindenyldiethylsilane, diindenylmethylethylsilane, diindenyldipropylsilane, diindenylethylpropylsilane, diindenyldiphenylsilane, diindenylphenylmethylsilane, diindenylmonomethoxysilane, diindenylmonoethoxysilane, triindenylmonomethylsilane, triindenylmonoethylsilane, triindenylmonomethoxysilane, triindenylmonoethoxysilane, 3-methylindenylsilane, bis-3-methylindenylsilane, 3-methylindenylmethylsilane, 1,2-dimethylindenylsilane, 1,3-dimethylindenylsilane, 1,2,4-trimethylindenylsilane, 1,2,3,4-tetramethylindenylsilane, and pentamethylindenylsilane. Preferred are cyclopentadiene substituted cyclopentadienes, indene, substituted indenes and the like.

Any of the above compounds bonded through alkylene groups (having usually 2 to 8, preferably 2 to 3, carbon atoms) are also mentioned as employable examples of component (4) in the invention. More concrete examples include bisindenylethane, bis(4,5,6,7-tetrahydro-1-indenyl) ethane, 1,3-propadinylbisindene, 1,3-propadinylbisindene-(4,5,6,7-tetrahydro)indene, propylenebis(1-indene), isopropyl(1-indene)cyclopentadienes, diphenylmethylene(9-fluorenyl)cyclopentadiene, and isopropylcyclopentadienyl-1-fluorene.

Although the specific metal oxide may be used as it is, it may be contacted, in advance before use thereof, with an organoaluminum compound such as, for example, trimethylaluminum, triethylaluminum, triisobutylaluminum, tri-n-hexylaluminum, dimethylaluminum chloride, diethylaluminum chloride, diethylmonoethoxyaluminum or triethoxyaluminum, or a modified organoaluminum compound having Al—O—Al bond which compound will be described later, or a silane compound.

Further, the specific metal oxide may be contacted, in advance before use thereof, with an active hydrogen-containing compound such as an ester or an ether, or an alkoxide group-containing compound such as a tetraalkoxysilicate, a trialkoxyaluminum or a transition metal tetraalkoxide.

For such a preliminary contact treatment there may be adopted a method wherein the specific metal oxide is contacted with a compound for the pretreatment exemplified above, with or without stirring, usually in an inert atmosphere of nitrogen or argon and in the presence of a liquid inert hydrocarbon such as an aromatic hydrocarbon usually having 6 to 12 carbon atoms, e.g. benzene, toluene, xylene or ethylbenzene or an alliphatic or alicyclic hydrocarbon usually having 5 to 12 carbon atoms, e.g. heptane, hexane, decane or dodecane. This contact treatment is performed usually at a temperature of −100° to 200° C. preferably −50° to 100° C., for 30 minutes to 50 hours, preferably 1 to 24 hours.

It is desirable to carry out the contact reaction in a solvent capable of dissolving the compound for the pretreatment, which solvent is an aromatic hydrocarbon usually having 6 to 12 carbon atoms, such as benzene, toluene, xylene or ethylbenzene. In this case, after the contact reaction, the solvent can be used as it is in preparing the catalyst to be used in the invention without removal of the solvent.

The specific metal oxide can be taken out as a solid component (4) by adding to the contact reaction product a liquid inert hydrocarbon (for example, an aliphatic or alicyclic hydrocarbon such as pentane, hexane, decane, dodecane or cyclohexane in the case of the pretreatment compound being a modified organoaluminum compound) which is incapable of dissolving or difficult to dissolve the pretreatment, allowing the component (4) to be precipitated and dried, or by removing a portion or the whole of the aromatic hydrocarbon which is the solvent used in the pretreatment, using a suitable means such as drying.

The ratio of the specific metal oxide, i.e., silicon oxide and/or aluminum oxide, subjected to the pretreatment is not specially limited as long as it does not affect the object of the present invention, but the amount of the pretreatment compound is usually selected within the range of 1 to 10,000 mmols, preferably 5 to 1,500 mmols, (Al atom concentration in the case of a modified organoaluminum compound), per 100 gram of the silicon oxide and/or aluminum oxide.

As mentioned above, the solid catalyst component containing the transition metal component (b) as an essential component is obtained by contacting the specific metal oxide (referred to as component (4)) and the above components (1) to (3) with one another, but in what order these components are to be contacted is not specially limited. For example, these components may be contacted by any of the following methods:

a) Components (1)–(4) are contacted simultaneously.

b) Components (1)–(3) are contacted simultaneously, followed by contact with component (4).

c) Components (2)–(4) are contacted simultaneously, followed by contact with component (1).

d) Components (1), (3) and (4) are contacted simultaneously, followed by contact with component (2).

e) Components (1), (2) and (4) are contacted simultaneously, followed by contact with component (3).

f) Components (1) and (2) are contacted together, followed by contact with component (3) and subsequent contact with component (4).

g) Components (1) and (2) are contacted together, followed by contact with component (4) and subsequent contact with component (3).

h) Components (1) and (3) are contacted together, followed by contact with component (2) and subsequent contact with component (4).

i) Components (1) and (3) are contacted together, followed by contact with component (4) and subsequent contact with component (2).

j) Components (1) and .(4) are contacted together, followed by contact with component (2) and subsequent contact with component (3).

k) Components (1) and (4) are contacted together, followed by contact with component (3) and subsequent contact with component (2).

l) Components (2) and (3) are contacted together, followed by contact with component (1) and subsequent contact with component (4).

m) Components (2) and (3) are contacted together, followed by contact with component (4) and subsequent contact with component (1).

n) Components (2) and (4) are contacted together, followed by contact with component (1) and subsequent contact with component (3).

o) Components (2) and (4) are contacted together, followed by contact with component (3) and subsequent contact with component (1).

p) Components (3) and (4) are contacted together, followed by contact with component (1) and subsequent contact with component (2).

q) Components (3) and (4) are contacted together, followed by contact with component (2) and subsequent contact with component (1).

r) Components (1) and (2) are contacted together, followed by contact with a contact product of components (3) and (4).

s) Components (1) and (3) are contacted together, followed by contact with a contact product of components (2) and (4).

t) Components (1) and (4) are contacted together, followed by contact with a contact product of components (2) and (3).

Above all, the methods a), b), h) and i) are preferred.

Also as to in what conditions these components are to be contacted, there is no special limitation, but according to a method usually adopted, the components are contacted with or without stirring in an inert atmosphere of nitrogen or argon and in the presence of a liquid, inert hydrocarbon such as an aromatic hydrocarbon usually having 6 to 12 carbon atoms, e.g. benzene, toluene, xylene or ethylbenzene or an aliphatic or alicyclic hydrocarbon usually having 5 to 12 carbon atoms, e.g. heptane, hexane, decane, dodecane or cyclohexane. This contact treatment is performed usually at a temperataure of $-100°$ C. to $200°$ C., preferably $-50°$ C. to $100°$ C., for 30 minutes to 50 hours, preferably 1 to 24 hours.

At the solvent to be used in the contact of components (1) to (4) there may be used an aromatic hydrcarbon solvent capable of dissolving some of the components or an aliphatic or alicyclic hydrocarbon solvent incapable of dissolving or difficult to dissolve some of the components. Particularly, the use of an aromatic hydrocarbon capable of dissolving components (1) to (3) is preferred. In the case where the contact reaction of the components is performed stepwise, a soluble aromatic hydrocarbon solvent used in a prior stage may be used as it is in a posterior stage of contact reaction without removal thereof. Further, there may be adopted a method wherein after a prior stage of contact reaction using a soluble solvent, there is added a liquid, inert hydrocarbon (for example an aliphatic or alicyclic hydrocarbon such as pentane, hexane, decane, dodecane or cyclohexane) incapable of dissolving or difficult to dissolve a certain component and a desired product is recovered as a solid matter, or a portion or the whole of an aromatic hydrocarbon is once removed by a suitable means such as drying, then the contact reaction of the desired product in a posterior stage is carried out using any of the inert hydrocarbon solvents referred to above. Of course, the contact reaction of the components may be performed a plural number of times.

After the contact reaction of the components in an inert hydrocarbon solvent, the reaction product may be used as it is in the polymerization without removal of the solvent. Alternatively, the catalyst component used may be taken out as a solid matter from the reaction product using a suitable means and then used in the polymerization.

As to the ratio of components (1)–(4), component (2) is usually employed in an amount of 0.01 to 100 mols, preferably 0.1 to 50 mols, more preferably 1 to 20 mols, most preferably 0.1 to 10 mols, and component (3) is usually employed in an amount of 0.01 to 100 mols, preferably 0.1 to 50 mols, more preferably 1 to 20 mols, most preferably 1 to 5 mols, both per mol of component (1). Further, in terms of a transition metal concentration ($Me^1$), component (1) is usually employed in the range of 0.01 to 500 mmols preferably 0.05 to 200 mmols, more preferably 0.1 to 20 mmols, based on 100 g of component (4).

[4] Transition Metal Component (c)

A further solid catalyst component for olefin polymerization also employable in the present invention is one obtained contacting the foregoing specific metal oxide with a transition metal compound of a Group IV metal in the Periodic Table having at least a cycloalkadienyl ring.

The said transition metal compound of a Group IV metal in the Periodic Table having a cycloalkadienyl ring is preferably represented by the following general formula:

$$(CP)_m Me R_n X_{4-m-n}$$

where Cp represents a cycloalkadienyl ring, Me is a transition metal of Group IV, R is hydrogen or an alkyl, aryl, aralkyl or alkoxy group having 1 to 24 carbon atoms, X is a halogen atom, and m and n satisfy the conditions of $0 < m \leq 4$, $0 \leq n < 4$, $0 < m+n \leq 4$.

The cycloalkadienyl ring as referred to herein usually has 5 to 20, preferably 5 to 12, carbon atoms. Examples are cyclopentadienyl, substituted cyclopentadienyl, indenyl and substituted indenyl. As examples of substituent groups there are mentioned hydrocarbon radicals (e.g. alkyl and aralkyl) having 1 to 6 carbon atoms. Substituent groups may be present in two or mroe positions. More concrete and suitable examples include cyclopentadienyl, methylcyclopentadienyl, ethylcyclopentadienyl, dimethylcyclopentadienyl, and indenyl and tetrahydroindenyl.

In the above general formula, Me, which represents a Group IV transition metal, is preferably Zr, Ti or Hf, with Zr being particularly preferred, and R is hydrogen or an alkyl, aryl, aralkyl or alkoxy group having 1 to 24 preferably 1 to 12, more preferably 1 to 8, carbon atoms. As examples of alkyl there are mentioned methyl, ethyl, propyl, isopropyl, and butyl, Examples of aryl are phenyl and tolyl. Examples of aralkyl are benzyl and neophyl. Examples of alkoxy are methoxy, ethoxy, propoxy, butoxy and 2-ethylhexyloxy. Further, as examples of halogen there are mentioned fluorine, chlorine and bromine.

Examples of the compound include, bis(cyclopentadienyl) zirconium, monochloride monohydride, bis(cyclopentadienyl) zirconium, monobromide monohydride, bis(cyclopentadienyl)methyl zirconium, hydride, bis(cyclopentadienyl)ethyl zirconium, hydride, bis(cyclopentadienyl)cyclohexyl zirconium hydride, bis(cyclopentadienyl)phenyl zirconium hydride, bis(cyclopentadienyl)benzyl zirconium hydride, bis(cyclopentadienyl)neopentyl zirconium hydride, bis(methylpentadienyl) zirconium monochloride monohydride, bis(indenyl) zirconium monochloride monohydride, bis(cyclopentadienyl) zirconium dichloride, bis(cyclopentadienyl) zirconium dibromide, bis(cyclopentadienyl)methyl zirconium monochloride, bis(cyclopentadienyl)ethyl zirconium monochloride, bis(cyclopentadienyl)cyclohexyl zirconium monochloride, bis(cyclopentadienyl)phenyl zirconium monochloride, bis(cyclopentadienyl)benzyl zirconium monochloride, bis(methylpentadienyl) zirconlure dichloride, bis(pentamethylcyclopentadienyl) zirconium dichloride, bis(indenyl) zirconium dichloride, bis(cyclopentadienyl) zirconium dimethyl, bis(cyclopentadienyl) zirconium diphenyl, bis(cyclopentadienyl) zirconium dibenzyl, bis(cyclopentadienyl)methoxy zirconium chloride, bis(cyclopentadienyl)ethoxy zirconium chloride, bis(cyclopentadienyl)butoxy zirconium chloride, bis(cyclopentadienyl)2-ethyl-hexyloxy zirconium chloride, bis(cyclopentadienyl)methyl zirconium ethoxide, bis(cyclopentadienyl)methyl zirconium butoxide, bis(cyclopentadienyl)ethyl zirconium ethoxide, bis(cyclopentadienyl)phenyl zirconium ethoxide, bis(cyclopentadienyl)benzyl zirconium ethoxide, bis(methylpentadienyl)ethoxy zirconium dichloride, bis(indenyl)ethoxy zirconium dichloride, bis(cyclopentadienyl)ethoxy zirconium, bis(cyclopentadienyl)butoxy zirconium, bis(cyclopentadienyl)2-ethylhexyloxy zirconium, bis(cyclopentadienyl) titanium monochloride monohydride, bis(cyclopentadienyl) titanium monobromide monohydride, bis(cyclopentadienyl)methyl titanium hydride, bis(cyclopentadienyl)ethyl titanium hydride, bis(cyclopentadienyl)cyclohexyl titanium hydride, bis(cyclopentadienyl)phenyl titanium hydride, bis(cyclopentadienyl)benzyl titanium hydride, bis(cyclopentadienyl)neopentyl titanium hydride, bis(methylpentadienyl) titanium monochloride monohydride, bis(indenyl) titanium monochloride monohydride, bis(cyclopentadienyl) titanium dichloride, bis(cyclopentadienyl) titanium bromide, bis(cyclopentadienyl)methyl titanium monochloride, bis(cyclopentadienyl)ethyl titanium monochloride, bis(cyclopentadienyl)cyclohexyl titanium monochloride, bis(cyclopentadienyl)phenyl titanium monochloride, bis(cyclopentadienyl)benzyl titanium monochloride, bis(methylcyclopentadienyl) titanium dichloride, bis(indenyl) titanium dichloride, bis(indenyl) titanium debromide, bis(cyclopentadienyl) titanium dimethyl, bis(cyclopentadienyl) titanium diphenyl, bis(cyclopentadienyl) titanium dibenzyl, bis(cyclopentadienyl)methoxy titanium chloride, bis(cyclopentadienyl)ethoxy titanium chloride, bis(cyclopentadienyl)butoxy titanium chloride, bis(cyclopentadienyl)2-ethylhexyloxy titanium chloride, bis(cyclopentadienyl)methyl titanium ethoxide, bis(cyclopentadienyl)methyl titanium butoxide, bis(cyclopentadienyl)ethyl titanium ethoxide, bis(cyclopentadienyl)phenyl titanium ethoxide, bis(cyclopentadienyl)benzyl titanium ethoxide, bis(methylpentadienyl)ethoxy titanium chloride, bis(indenyl)ethoxy titanium chloride, bis(cyclopentadienyl)ethoxy titanium, bis(cyclopentadienyl)butoxy titanium bis(cyclopentadienyl)2-ethylhexyloxy titanium bis(cyclopentadienyl) hafnium monochloride monohydride, bis(cyclopentadienyl) hafnium monobromide monohydride, bis(cyclopentadienyl)methyl hafnium hydride, bis(cyclopentadienyl)ethyl hafnium hydride, bis(cyclopentadienyl)cyclohexyl hafnium hydride, bis(cyclopentadienyl)phenyl hafnium hydride, bis(cyclopentadienyl)benzyl hafnium hydride, bis(cyclopentadienyl) neopentyl hafnium hydride, bis(methylpentadienyl) hafnium monochloride monohydride, bis(indenyl) hafnium monochloride monohydride, bis(cyclopentadienyl) hafnium dichloride, bis(cyclopentadienyl) hafnium bromide, bis(cyclopentadienyl)methyl hafnium monochloride, bis(cyclopentadienyl)ethyl hafnium monochloride, bis(cyclopentadienyl)cyclohexyl hafnium monochloride, bis(cyclopentadienyl)phenyl hafnium monochloride, bis(cyclopentadienyl)benzyl hafnium monochloride, bis(methylcyclopentadienyl) hafnium dichloride, bis(pentamethylcyclopentadienyl) hafnium dichloride, bis(indenyl) hafnium dichloride, bis(indenyl) hafnium debromide, bis(cyclopentadienyl) hafnium dimethyl, bis(cyclopentadienyl) hafnium diphenyl, bis(cyclopentadienyl) hafnium dibenzyl, bis(cyclopentadienyl)methoxy hafnium chloride, bis(cyclopentadienyl)ethoxy hafnium chloride, bis(cyclopentadienyl)butoxy hafnium chloride, bis(cyclopentadienyl)2-ethylhexyloxy hafnium chloride, bis(cyclopentadienyl)methyl hafnium ethoxide, bis(cyclopentadienyl)methyl hafnium butoxide, bis(cyclopentadienyl)ethyl hafnium ethoxide, bis(cyclopentadienyl)phenyl hafnium ethoxide, bis(cyclopentadienyl)benzyl hafnium ethoxide, bis(methylpentadienyl)ethoxy hafnium chloride, bis(indenyl)ethoxy hafnium chloride, bis(cyclopentadienyl)ethoxy hafnium, bis(cyclopentadienyl)butoxy hafnium and bis(cyclopentadienyl)2-ethyl-hexyloxy hafnium More preferred are bis(cyclopentadienyl) zirconium dichloride, bis(methylcyclopentadienyl) zirconium dichloride bis(pentamethytcyclopentadienyl) zirconium dichloride bis(indenyl) zirconium dichloride and the like.

In supporting a Group IV transition metal compound on the specific metal oxide, it is optional whether an inert solvent is used or not in the case where the transition metal compound is liquid, while in the case where the transition metal compound is solid at room temperature, the use of an inert solvent capable of dissolving the transition metal compound is generally preferred.

An examples of employable inert solvents, mention may be made of the same inert solvents as those employable in the pretreatment of the metal oxide. Particularly preferred are aromatic hydrocarbons such as benzene and toluene, as well as halogenated hydrocarbons such as chlorobenzene.

The amount of the transition metal compound used in the above supporting reaction is in the range of 0.001 to 10 mmols, preferably 0.005 to 5 mmols, more preferably 0.01 to 1 mmol per gram of the metal oxide.

The amount of the inert solvent used in the same reaction is in the range of 0.5 to 1,000 ml, preferably 1 to 100 ml, more preferably 2 to 50 ml, per gram of the metal oxide.

The supporting reaction in question can be carried out by contacting and mixing the metal oxide and the transition metal compound with each other at a temperature in the range of 0° to 200° C., preferably 0° to 100° C., more preferably 20° to 80° C., for 1 minute to 10 hours, preferably 5 minutes to 5 hours, more preferably 10 minutes to 3 hours.

After the reaction is carried out in the above manner, the liquid portion of the reaction mixture is removed by filtration, decantation, or any other suitable method, preferably followed by washing several times using an inert solvent.

In the resulting solid catalyst component there is contained the transition metal compound usually in an amount of 0.005 to 5 mmols, preferably 0.01 to 1 mmol, more preferably 0.03 to 0.3 mmol, per gram of the solid catalyst component.

Of course, the above catalyst constituents may be further contacted with an additional component such as, for example, a compound of a Group I–III metal in the Periodic Table, e.g. a magnesium halide or an organomagnesium compound, an aluminum compound, e.g. an aluminum halide, an organoaluminum compound or an organoaluminum halide, or a lithium compound, e.g. an organolithium compound, the resulting reaction product may be used as a catalyst component.

By combining the solid catalyst component comprising the transition metal component (b) or (c) described above with a modified organoaluminum compound there is obtained a catalyst for the polymerization of olefins.

The modified organoaluminum compound employable suitably in the present invention contains Al—O—Al bond in the molecule. The number of such bond is usually in the range of 1 to 100, preferably 1 to 50. Usually, such a modified organoaluminum compound is a product obtained by the reaction of an organoaluminum compound and water. This reaction is usually conducted in an inert hydrocarbon. Examples of inert hydrocarbons employable in this reaction include aliphatic, alicyclic and aromatic hydrocarbons such as pentane, hexane, heptane, cyclophexane, methylcyclohexane, benzene, toluene and xylene. But it is desirable to use an aliphatic or aromatic hydrocarbon.

As the organoaluminum compound for use in preparing the modified organoaluminum compound there may be used any of those represented by the general formula $R_n AlX_{3-n}$ where R is a hydrocarbon radical such as an alkyl, alkenyl, aryl or aralkyl group having 1 to 18 preferably 1 to 12, carbon atoms X is a hydrogen atom or a halogen atom, and n is an integer of $1 \leq n \leq 3$. But the use of a trialkylaluminum is preferred. The alkyl group in the trialkylaluminum may be any of methyl, ethyl, propyl, isopropyl, butyl, isobutyl, pentyl, hexyl, octyl, decyl and dodecyl, with methyl being particularly preferred.

The reaction ratio (water/Al mole ratio) of water to the organoaluminum compound is in the range of 0.25/1 to 1.2/1, preferably 0.5/1 to 1/1. The reaction temperature is usually in the range of −70° to 100° C., preferably −20° to 20° C., and the reaction time is usually in the range of 5 min to 24 hours, preferably 10 min to 5 hours. As the water to be used in the reaction there may be used water of crystallization contained in a copper sulfate hydrate or an aluminum sulfate hydrate or even a component which can produce water in the reaction system.

According to the present invention, an olefin or olefins are homopolymerized or copolymerized in the presence of a catalyst comprising the foregoing catalyst component and a promotor component typified by the modified organoaluminum compound described above. In this case, the catalyst component and the modified organoaluminum compound may be fed into the polymerization reaction system separately or as a mixture of the two prepared in advance. A suitable ratio between the catalyst component and the modified organoaluminum compound is selected in such a manner that the atomic ratio of aluminum in the modified organoaluminum compound to the transition metal in the catalyst component is in the range from 1 to 100,000, preferably 5 to 1,000, more preferably 50 to 100.

The process according to the present invention is applicable to the preparation of various olefin polymers and copolymers.

The olefins as referred to herein include α-olefins, cyclic olefins, dienes, trienes and styrene analogs. In the α-olefins there are included those having 2 to 12, preferably 2 to 8, carbon atoms. Examples are ethylene, propylene, butene-1, hexene-1 and 4-methylpentene-1. Using the catalyst according to the invention, not only an α-olefin can be copolymerized. The homopolymerized, but also two or more α-olefins can be copolymerized. The copolymerization may be any of alternating copolymerization, random copolymerization and block copolymerization.

As examples of the copolymerization of α-olefins there are mentioned copolymerization of ethylene and α-olefins having 3 to 12, preferably 3 to 8, carbon atoms, such as ethylene/propylene, ethylene/butene-1, ethylene/hexene-1 and ethylene/4-methylpentene-1, as well as copolymerizations of propylene and α-olefins having 3 to 12, preferably 3 to 8, carbon atoms such as propylene/butene-1, propylene/4-methylbutene-1, propylene/hexene-1 and propylene/octene-1. In the copolymerization of ethylene or propylene with another α-olefin, the amount of the α-olefin can be selected suitably in the range not exceeding 90 mol % of the total amount of monomers. But it is usually not more than 40 mol %, more preferably not more than 30 mol %, more preferably not more than 20 mol %, in the case of ethylene copolymer, while in the case of propylene copolymer, it is selected in the range of 1–90 mol %, preferably 5–90 mol %, more preferably 10–70 mol %.

As cyclic olefins, those having 3 to 24, preferably 3 to 18, carbon atoms are employable in the invention. Examples are cyclopentene, cyclobutene, cyclohexene, 3-methylcyclohexene, cyclooctene, cyclodecene, cyclododecene, tetracyclodecene, octacyclodecene, dicyclopentadiene, norbornene, 5-methyl-2-norbornene, 5-ethyl-2-norbornene, 5-isobutyl-2-norbornene, 5,6-dimethyl-2-norbornene, 5,5,6-trimethyl-2-norbornene, and ethylidene norbornene. Usually, a cyclic olefin if copolymerized with an α-olefin referred to above. In this case, the amount of the cyclic olefin is not larger than 50 mol %, usually in the range of 1 to 50 mol %, preferably 2 to 50 mol %.

Dienes and trienes employable in the invention are chain polyenes which can be represented by the following general formula:

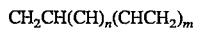

$$CH_2CH(CH)_n(CHCH_2)_m$$

where m is 1 or 2 and n is 0 to 20, preferably 2 to 20. Examples of such polyenes include butadiene, 1,4-hexadiene, 1,5-hexadiene, 1,9-decadiene, 1,13-tetradecadiene, 2,6-dimethyl-1,5-hexadiene, 2-methyl-2,7-octadiene, 2,7-dimethyl-2,6-octadiene, and 1,5,9-decatriene. In the case of using a chain diene or triene of the above general formula, it is usually copolymerized with an α-olefin referred to above, and in this case, the content of the chain diene and/or triene in the resulting copolymer is usually in the range of 0.1 to 50 mol %, preferably 0.2 to 10 mol %.

Styrene analogs employable in the invention include styrene and styrene derivatives. As examples of such derivatives, mention may be made of t-butylstyrene, α-methylstyrene, p-methylstyrene, divinylbenzene, 1,1-diphenylethylene, N,N-dimethyl-p-aminoethylstyrene and N,N-diethyl-p-aminoethylstyrene.

The catalyst according to the present invention is also suitable for the polymerization of such an olefin homopolymer or copolymer as referred to above further with polar monomer to modify the homopolymer or copolymer. As examples of the polar monomer there are mentioned unsaturated carboxylic acid esters such as, for example, methyl acrylate, methyl methacrylate, butyl methacrylate, dimethyl maleate, diethyl maleate, monomethyl maleate, diethyl fumarate and dimethyl itaconate. The polar monomer content of the thus-modified copolymer is usually in the range of 0.1 to 10 mol %, preferably 0.2 to 2 mol %.

The polymerization reaction may be carried out by slurry polymerization, solution polymerization or vapor-phase polymerization in the presence of the catalyst according to the invention and a promotor, with slurry polymerization or vapor phase polymerization being particularly preferred. Olefin is polymerized in a substantially oxygen- and water-free condition in the presence or absence of an inert hydrocarbon solvent selected form the group consisting of, for example, aliphatic hydrocarbons such as hexane and heptane, aromatic hydrocarbons such as benzene, toluene and xylene and alicyclic hydrocarbons such as cyclohexane and methylcyclohexane. Usually, the polymerization is performed at a temperature in the range from 20° to 200° C., preferably 50° to 100° C., a pressure in the range from atmospheric pressure to 70 kg/cm$^2$G, preferably from atmospheric pressure to 20 kg/cm$^2$G, for 5 minutes to 10 hours, preferably 5 minutes to 5 hours.

The molecular weight of the resulting polymer can be adjusted to some extent by changing such polymerization conditions as polymerization temperature and catalyst molar ratio, but the addition of hydrogen into the polymerization reaction system is more effective for this purpose.

A component for the removal of water, what is called a scavenger, may be added into the polymerization system. As examples of the scavenger there are mentioned organoaluminum compounds such as trimethylaluminum, triethylaluminum and triisobutylaluminum, the foregoing modified organoaluminum compounds, branched alkyl-containing modified organoaluminum compounds, organolithium compounds such as butyllithium, and organomagnesium compounds such as diethylmagnesium, dibutylmagnesium and butylmagnesium chloride.

The present invention is also applicable to a multi-stage polymerization of two or more stages involving different hydrogen concentration, different monomer quantities and different polymerization pressures and temperatures.

EXAMPLES

The following examples are given to illustrate the present invention more concretely, but it is to be understood that the invention is not limited thereto.

The following methods were adopted for measuring an average particle diameter, specific surface area, pore volume, apparent specific gravity and the degree of ultrasonic disintegration, of the metal oxide used in the invention.

<Average Particle Diameter>

1.5 g of a sample is placed in each of ten standard sieves having an inside diameter of 75 mm (nominal size: 22, 32, 53, 75, 100, 125, 150, 180, 212, 250 μm, respectively), then after shaking for 20 minutes, weight % of the sample on each sieve is plotted on a logarithmic probability paper and a particle diameter corresponding to 50% integrated value is used as an average particle diameter.

<Specific Surface Area>

Measured using an automatic specific surface area measuring device Model 2200 (a product of Shimazu Seisakusho Ltd.) in a conventional manner by the BET method.

<Pore Volume>

Measured at a pressure of 0.033 to 4,200 kg/cm$^2$, using Micromeritics Autopore 9220 (a product of Shimazu Seisakusho Ltd.). The volume of pores ranging in radius between 18 and 1,000 Angstroms is regarded as a pore volume.

<Apparent Specific Gravity>

Measured in accordance with the apparent specific gravity measuring method defined by JIS K-6220-6.8.

<Degree of Ultrasonic Disintegration>

10 g of a sample is placed in each of standard sieves having an inside diameter of 30 cm and nominal sizes of 53 μm and 75 μm, respectively, and after shaking for 10 minutes, the sample on the 53 μm sieve is used in an ultrasonic disintegration test. According to this test, 20 ml of pure water is put into a 50 ml Erlenmeyer flask, into which is then placed 1 g of the sample on the 53 μm sieve, and there is performed an ultrasonic treatment (40 KHz, 35 W) using an ultrasonic washer VS-50R (a product of VELVO-CLEAR Co.) for 20 minutes. Then, 20 g of glycerin is added, a particle size distribution is measured using a particle size distribution measuring device SA-CP3 (a product of Shimazu Seisakusho Ltd.), and the percent of 50 μm or less is used as the degree of ultrasonic disintegration.

The melting of each polymer obtained was determined by the following method.

<Melting Point>

Using a melting point measuring device Model DSC-20 (a product of Seiko Denshi K.K.), a polymer sample (5 mg) is held at 180° C. for 3 minutes, then cooled to 0° C. at a rate of 10° C./min, and after holding the sample at 0° C. for 10 minutes, the temperature is raised at a rate of 10° C./min to determine a melting point.

<Preparation of Modified organoaluminum compound>

13 g of copper sulfate pentahydrate was placed in a three-necked flask having an internal volume of 300 ml and equipped with an electromagnetic induction stirrer and was suspended in 50 ml of toluene. Then, 150 ml of a solution containing 1 mmol/ml of trimethylaluminum was added dropwise into the resulting suspension at 0° C. over a 2 hour period. Thereafter, the temperature was raised to 25° C. and reaction was allowed to take place at that temperature for 24 hours. Subsequently, the reaction solution was filtered to remove toluene contained therein, thereby affording 4 g of methylaluminoxane as white crystals.

<Preparation of Solid Catalyst Component>

Table 1 shows properties of silicon compounds and/or aluminum compounds used in the following working examples and comparative examples.

TABLE 1

Properties of Metal Oxides

| No. | Kind | (A) Average Particle Diameter μm | (B) Surface Area m²/g | (C) Pore Volume cm³/g | (D) Apparent Specific Gravity g/cm³ | (E) Degree of Ultrasonic Disintegration % |
|---|---|---|---|---|---|---|
| I | silica | 52 | 290 | 0.95 | 0.40 | 5 |
| II | " | 45 | 310 | 1.00 | 0.38 | 7 |
| III | " | 62 | 260 | 0.90 | 0.37 | 4 |
| IV | " | 55 | 270 | 1.20 | 0.35 | 14 |
| V | alumina | 60 | 250 | 0.75 | 0.40 | 3 |
| VI | silica-alumina | 60 | 500 | 0.90 | 0.40 | 2 |
| VII | silica | 50 | 290 | 1.00 | 0.28 | 12 |
| VIII | " | 53 | 280 | 0.95 | 0.33 | 35 |
| IX | " | 48 | 300 | 1.25 | 0.29 | 52 |

Solid Catalyst Component (a)
Solid Catalyst Component A

A three-necked 500 ml flask equipped with a stirrer and a reflux condenser was purged with nitrogen, into which was then placed 50 g of silica I shown in Table 1, then 160 ml of dehydrated hexane and 2.2 ml of titanium tetrachloride were added and reaction was allowed to take place under the reflux of hexane for 3 hours. After cooling, 30 ml of a 1 mmol/cc solution of diethylaluminum chloride in hexane is added and reaction is again allowed to take place under at hexane reflux for 2 hours, followed by drying under a reduced pressure at 120° C. to remove hexane.

10 g of a commercially available, anhydrous magnesium chloride and 4.2 g of triethoxyaluminum were put into a stainless steel pot having an internal volume of 400 ml and containing 25 stainless steel balls each ½ inch in diameter, and ball-milled at room temperature in a nitrogen atmosphere for 16 hours to afford a reaction product.

5.4 g of the reaction product was dissolved in 160 ml of dehydrated ethanol, then the whole quantity of the resulting solution was added into the three-necked flask and reaction was allowed to proceed under the reflux of ethanol for 3 hours, followed by drying under a reduced pressure at 150° C. for 6 hours to obtain a solid catalyst component.

Solid Catalyst Component B

A solid catalyst component was prepared in the same way as in the preparation of the solid catalyst component A except that silica II in Table 1 was used in place of the silica I.

Solid Catalyst Component C 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled at room temperature in a nitrogen atmosphere for 16 hours to obtain a reaction product.

A three-necked flask equipped with a stirrer and a reflux condenser was purged with nitrogen, into which was then fed 100 g of dehydrated 2-methyl-1-pentanol, 5.0 g of the anhydrous magnesium chloride-triethoxyaluminum reaction product prepared above and 10.0 g of tetraethoxytitanium, and reaction was allowed to take place at 80° C. for 1 hours. After cooling to room temperature, 46 g of silica I in Table 1 is added and reaction was again allowed to take place at 80° C. for 2 hours, followed by drying under a reduced pressure at 120° C. for 2 hours to afford a solid powder. Then, 100 cc of dehydrated hexane and 10.0 g of diethylaluminum chloride were added and reaction was allowed to proceed at room temperature for 1 hour, followed by blowing of nitrogen at 60° C. for 3 hours to remove hexane, thereby affording a solid catalyst component.

Solid Catalyst Component D

A solid catalyst component was prepared in the same way as in the preparation of the solid catalyst component C except that silica II in Table 1 was used in place of the silica I.

Solid Catalyst Component E 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled at room temperature in a nitrogen atmosphere for 16 hours to obtain a reaction product.

A three-necked flask equipped with a stirrer and a reflux condenser was purged with nitrogen, into which were fed 5 g of the reaction product obtained above and 5 g of silica III in Table 1. Then, 100 ml of tetrahydrofuran was added and reaction was allowed to take place at 60° C. for 2 hours, followed by drying under a reduced pressure at 120° C. to remove tetrahydrofuran.

Next, 50 ml of hexane was added and stirring was performed, then 1.1 ml of titanium tetrachloride was added and reaction was allowed to take place under the reflux of hexane for 2 hours, followed by blowing of nitrogen at 60° C. for 3 hours to remove hexane. A solid powder thus obtained was put into 50 ml of hexane, then 1 ml of tetraethoxysilane was added and reaction was allowed to to proceed at hexane reflux of hexane for 2 hours, followed by blowing of nitrogen at 60° C. for 3 hours to remove hexane, thereby affording a solid catalyst component.

Solid Catalyst Component F

A solid catalyst component was prepared in the same way as in the preparation of the solid catalyst component E except that silica IV in Table 1 was used in place of the silica III.

Solid Catalyst Component G 10 g of a commercially available, anhydrous magnesium chloride and 4.2 g of triethoxyaluminum were placed in a stainless steel pot having an internal volume of 400 ml and containing 25 stainless steel balls each ½ inch in diameter, and ball-milled at room temperature in a nitrogen atmosphere for 16 hours to obtain a reaction product.

A three-necked flask equipped with a stirrer and a reflux condenser was purged with nitrogen, into which were fed 5 g of silica III in Table 1 and then, 100 ml of tetrahydrofuran, and reaction was allowed to take place at 60° C. for 2 hours, followed by drying under a reduced pressure at 120° C. to remove tetrahydrofuran.

Next, 3 ml of silicon tetrachloride was added and reaction was allowed to take place at 60° C. for 2 hours. Thereafter, 1.6 ml of titanium tetrachloride was added and reaction was allowed to proceed at 130° C. for 2 hours to afford a solid catalyst component.

Solid Catalyst Component H

A solid catalyst component was prepared in the same way as in the preparation of the solid catalyst component G except that silica IV in Table 1 was used in place of the silica III.

Solid Catalyst Component I

A solid catalyst component was prepared in the same way as in the preparation of the solid catalyst component A except that alumina V in Table 1 was used in place of the silica I.

Solid Catalyst Component J

A solid catalyst component was prepared in the same way as in the preparation of the solid catalyst component A except that silica-alumina VI in Table 1 was used in place of the silica I.

Solid Catalyst Component k

A solid catalyst component was prepared in the same way as in the preparation of the solid catalyst component A except that silica VII in Table 1 was used in place of the silica I.

Solid Catalyst Component L

A solid catalyst component was prepared in the same way as in the preparation of the solid catalyst component C except that silica VIII in Table 1 was used in place of the silica I.

Solid Catalyst Component M

A solid catalyst component was prepared in the same way as in the preparation of the solid catalyst component G except that silica IX in Table 1 was used in place of the silica III.

Solid Catalyst Component N 10 g of a commercially available, anhydrous magnesium chloride and 4.56 g of vinyltriethoxysilane and 1.51 g of phenol were placed in a stainless steel pot having an internal volume of 400 ml and containing 25 stainless steel balls each ½ inch in diameter, and ball-milled at room temperature in a nitrogen atmosphere for 6 hours, then 0.68 g of phenyl ether was added and ball milling was further conducted at room temperature in a nitrogen atmosphere for 16 hours to obtain a solid reaction product.

A three-necked flask equipped with a stirrer and a reflux condenser was purged with nitrogen, into which were then fed 100 g of dehydrated ethanol and 5.0 g of the solid reaction product obtained above, and reaction was allowed to take place at 80° C. for 1 hour. Thereafter, the temperature was reduced to room temperature and 10.0 g of titaniuim tetrachloride was added over a 1 hour period.

Next, 46 g of Silica I in Table 1 was added and reaction was again allowed to proceed at 80° C. for 2 hours, followed by drying under a reduced pressure at 120° C. for 2 hours to afford a solid powder. Then, 100 cc of dehydrated hexan and 10.0 g of diethylaluminum chloride were added and reaction was allowed to take place at room temperature for 1 hour, followed by blowing of nitrogen at 60° C. for 3 hours to remove hexane, thereby affording a solid catalyst component.

Solid Catalyst Component O

A solid catalyst component was prepared in the same way as in the preparation of the solid catalyst component N except that silica II in Table 1 was used in place of the silica I.

Solid Catalyst Component P

A solid catalyst component was prepared in the same way as in the preparation of the solid catalyst component N except that silica IX in Table 1 was used in place of the silica I.

Solid Catalyst Component (b)

Solid Catalyst Component $A^1$ (1) Contact of Components (1), (2) and (3)

100 ml of purified toluene, 5.84 g of triethylaluminum and 2.2 g of indene were charged into a three-necked 300 ml flask, followed by cooling to −60° C. to prepare a solution.

Into another flask of 100 ml were fed 50 ml of toluene, 4.2 of of zirconium tetrapropoxide [$Zr(OPr)_4$] and 0.8 g of indene to prepare a solution. This solution was added into the above solution over a 20 minute period. Thereafter, stirring was continued at −60° C. for 1 hour and then the temperature was raised gradually to 20° C. over a 2 hour period under stirring. The stirring was further continued at 45° C. for 3 hours to obtain a solution of black color. The concentration of the black solution was 0.075 mmol/ml as Zr.

(2) Pretreatment of Component (4)

Into a three-necked 300 ml flask was fed 100 ml of purified toluene, then 10 g of silica I in Table 1 was added, and further added was 6.0 ml of a methylaluminoxane solution in toluene (concentration: 2.5 mmol/ml). After stirring at room temperature for 2 hours, drying was performed by blowing of nitrogen to obtain a particulate matter having fluidity.

(3) Preparation of Solid Catalayst Component 10 g of the carrier component prepared in the above (2) was placed in a three-necked 300 ml flask, then 30 ml of a toluene solution of the catalyst component prepared in the above (1) was added, and further added was 15 ml of purified toluene. After stirring at room temperature for 2 hours, the solvent was removed by blowing of nitrogen and under a reduced pressure to yield 11 g of a solid catalyst component.

Solid Catalyst Component $B^1$

A solid catalyst component was prepared in the same manner as in the preparation of the solid catalyst component $A^1$ except that silica II in Table 1 was used in place of the silica I.

Solid Catalyst Component $C^1$ (1) Contact of Components (1), (2) and (3)

150 ml of purified toluene, 11.7 g of triethylaluminum, 13.4 g of bisindenylethane and 13.9 g of $Zr(OPr)_3Cl$ were charged into a three-necked 300 ml flask at room temperature in a nitrogen atmosphere, followed by stirring at 45° C. for 2 hours to obtain a contact reaction product of the above three components.

(2) Pretreatment of Component (4)

100 ml of purified toluene was fed into a three-necked 300 ml flask, then 10 g of silica III in Table 1 was added, and further added was 15.0 ml of a trimethylaluminum solution in toluene (concentration: 1 mmol/ml). After stirring at room temperature for 2 hours, drying was performed by blowing of nitrogen to afford a particulate matter having fluidity.

(3) Preparation of Solid Catalyst Component 10 g of the carrier component obtained in the above (2) was put into a three-necked 300 ml flask, then, 30 ml of a toluene solution of the catalyst component prepared in the above (1) was added, and further added was 15 ml of purified toluene, followed by stirring at room temperature for 2 hours. Thereafter, the solvent was removed by blowing of nitrogen and under a reduced pressure to yield 11 g of a solid catalyst component.

Solid Catalyst Component $D^1$ (1) Pretreatment of Component (4)

100 ml of purified toluene was fed into a three-necked 300 ml flask, then 10 g of silica IV in Table 1 was added, and further added was 15.0 ml of a $Zr(OPr)_4$ solution in hexane (concentration: 1 mmol/ml). After stirring at room temperature for 2 hours, drying was performed by blowing of nitrogen to obtain a particulate matter having fluidity.

(2) Preparation of Solid Catalayst Component 10 g of the carrier component obtained in the above (1) was put into a three-necked 300 ml flask in a nitrogen atmosphere, then, 100 ml of purified n-hexane was added, then further added were 0.84 g of triethylaluminum and 0.12 g of cyclopentadiene, followed by stirring at room temperature in a nitrogen atmosphere for 2 hours. Thereafter, 0.5 g of $Zr(OEt)_4$ was added and stirring was conducted at 45° C. in a nitrogen atmosphere for 2 hours. Subsequently, the solvent was removed by blowing of nitrogen and under a reduced pressure, leaving a solid catalyst component.

Solid Catalyst Component $E^1$ (1) Contact of Components (1), (2) and (3)

100 ml of purified toluene, 50 ml of an ethylmagnesium chloride (EtMgCl) solution in tetrahydrofuran (THF)(concentration: 2 mmol/ml) and 2.2 g of indene were charged into a three-necked 300 ml flask, followed by cooling to −60° C. to prepare a solution.

Into another flask of 100 ml were fed 50 ml of toluene, 4.2 of of zirconium tetrapropoxide $Zr(OPr)_4$ and 0.8 g of indene to prepare a solution. This solution was then added into the above solution over a 20 minute period. Thereafter, stirring was continued at −60° C. for 1 hour and then the temperature was raised gradually to 20° C. over a 2 hour period under stirring. The stirring was further continued at 45° C. for 3 hours to prepare a solution of black color.

(2) Pretreatment of Component (4)

100 ml of purified toluene was fed into a three-necked 300 ml flask, then 10 g of silica III in Table 1 was added, and further added was 6.0 ml of a methyl aluminoxane solution in toluene (concentration: 2.5 mmol/ml). After stirring at room temperature for 2 hours, drying was performed by blowing of nitrogen to obtain a particulate matter having fluidity.

(3) Preparation of Solid Catalayst Component 10 g of the carrier component obtained in the above (2) was put into a three-necked 300 ml flask in a nitrogen atmosphere, then, 30 ml of a toluene solution of the catalyst component prepared in the above (1) was added, and further added was 15 ml of purified toluene, followed by stirring at room temperature for 2 hours. Thereafter, the solvent was removed by blowing of nitrogen and under a reduced pressure to yield 11 g of a solid catalyst component.

Solid Catalyst Component $F^1$

A solid catalyst component was prepared in the same manner as in the preparation of the solid catalyst component $F^1$ except that the silica III was substituted by the silica IV in Table 1.

Solid Catalyst Component $G^1$

A solid catalyst component was prepared in the same manner as in the preparation of the solid catalyst component $A^1$ except that the silica I was substituted by. alumina V in Table 1.

Solid Catalyst Component $H^1$

A solid catalyst component was prepared in the same manner as in the preparation of the solid catalyst component $A^1$ except that the silica I was substituted by silica-alumina VI in Table 1.

Solid Catalyst Component $I^1$ (1) Contact of Components (1), (2) and (3)

100 ml of purified toluene, 2.6 g of zirconium tetrabutoxide and 6.5 g of indene were charged into a three-necked 300 ml flask, followed by stirring at room temperature for 1 hour. Next, the temperature was reduced to −60° C. and 18.5 ml of trihexylaluminum was added over a 20 minute period. Thereafter, stirring was continued at −60° C. for 1 hour and then the temperature was raised gradually to 20° C. over a 2 hour period under stirring. The stirring was further continued at 45° C. for 3 hours to prepare a solution of black color.

(2) Pretreatment of Component (4)

100 ml of purified n-butanol was fed into a three-necked 300 ml flask, then 30 g of silica I in Table 1 was added and reaction was allowed to take place under the reflux of n-butanol for 2 hours. Thereafter, the n-butanol was removed by distillation, followed by drying a 120° C. in vacuum to afford a particulate matter having fluidity.

(3) Preparation of Solid Catalyst Component 10 g of the carrier component obtained in the above (2) was put into a three-necked 300 ml flask in a nitrogen atmosphere, then, 42 ml of a methylaluminoxane solution in toluene (concentration: 2.6 mmol/ml, a product of Toso-Akzo Co.) was added and reaction was allowed to take place at room temperature for 16 hours. Next, 20 ml of a toluene solution of the catalyst component prepared in the above (1) was added and stirring was performed at room temperature for 2 hours. Thereafter, the solvent was removed by blowing of nitrogen leaving 19 of a solid catalyst component.

Solid Catalyst Component $J^1$

A solid catalyst component was prepared in the same manner as in the preparation of the solid catalyst component $C^1$ except that the silica III was substituted by silica II in Table 1.

Solid Catalyst Component $K^1$

A solid catalyst component was prepared in the same manner as in the preparation of the solid catalyst component $A^1$ except that the silica I was substituted by silica VII in Table 1.

Solid Catalyst Component $L^1$

A solid catalyst component was prepared in the same manner as in the preparation of the solid catalyst component $G^1$ except that the Alumina V was substituted by silica VIII in Table 1.

Solid Catalyst Component $M^1$

A solid catalyst component was prepared in the same manner as in the preparation of the solid catalyst component $I^1$ except that the silica I was substituted by silica IX in Table 1.

Solid Catalyst Component $N^1$ (1) Contact of Components (1), (2) and (3)

150 ml of purified toluene, 3.8 g of zirconium tetrabutoxide $[Zr(OBu)_4]$ and 5.16 g of ethylenebisindenylethane were charged into a three-necked 300 ml flask. After stirring at room temperature for 30 minutes, the system was held at 0° C. and 3.1 g of trimethylaluminum was added dropwise over a 5 minute period, then the system was waramed back to room temperature and stirring was conducted for 2 hours. The concentration of this solution was 0.062 mmol/ml as Zr.

(2) Pretreatment of Component (4)

100 ml of purified toluene was fed into a three-necked 300 ml flask, then 10 g of silica I in Table 1 was added, and further added was 6.0 ml of a methylaluminoxane solution in toluene (concentration: 2.5 mmol/ml). After stirring at room temperature for 2 hours, drying was performed by blowing of nitrogen to afford a particulate matter having fluidity.

(3) Preparation of Solid Catalyst Component 10 g of the carrier component prepared in the above (2) was put into a three-necked 300 ml flask in a nitrogen atmosphere, then, 50 ml of toluene and 3.5 ml of a toluene solution of the catalyst component prepared in the above (1)

was added and stirring was conducted at room temperature for 2 hours. Thereafter, the solvent was removed by blowing of nitrogen leaving 11 g of a solid catalyst component.

Solid Catalyst Component $O^1$

A solid catalyst component was prepared in the same manner as in the preparation of the solid catalyst component $N^1$ except that the silica I was substituted by silica II in Table 1.

Solid Catalyst Component $P^1$

A solid catalyst component was prepared in the same manner as in the preparation of the solid catalyst component $N^1$ except that the silica I was substituted by silica IX in Table 1.

Solid Catalyst Component (c)

Solid Catalyst Component $A^2$ 100 ml of purified toluene was fed into a three-necked 300 ml flask, then 10 g of silica I in Table 1 was added, and further added was 6.0 ml of a methylaluminoxane solution in toluene (concentration: 2.5 mmol/ml). After stirring at room temperature for 2 hours, drying was performed by blowing of nitrogen to obtain a particulate matter having fluidity.

50 ml of toluene was put into a three-necked flask, then 10 g of the carrier component prepared in the above was added in a nitrogen atmosphere, and subsequently added was 20 ml of a bis(cyclopentadienyl) zirconium dichloride solution in toluene (concentration: 0.05 mmol/ml). After stirring at room temperature for 2 hours, the solvent was removed by blowing of nitrogen and leaving a solid catalyst component.

Solid Catalyst Component $B^2$

A solid catalyst component was prepared in the same way as in the preparation of the catalyst component $A^2$ except that the silica II in Table 1 was used as an alternative to the silica I.

Solid Catalyst Component $C^2$

A solid catalyst component was prepared in the same way as in the preparation of the solid catalyst component $A^2$ except that 20 ml of a bis(indenyl)zirconium dichloride solution in toluene (concentration: 0.05 mmol/ml) was used as an alternative to the bis(cyclopentadienyl) zirconium dichloride solution in toluene.

Solid Catalyst Component $D^2$

A solid catalyst component was prepared in the same way as in the preparation of the solid catalyst component $A^2$ except that 20 ml of a bis(cyclopentadienyl)titanium dichloride solution in toluene (concentration: 0.05 mmol/ml) was used as an alternative to the bis(cyclopentadienyl)zirconium dichloride solution in toluene.

Solid Catalyst Component $E^2$

A solid catalyst component was prepared in the same way as in the preparation of the solid catalyst component $A^2$ except that 20 ml of a bis(cyclopentadienyl) hafnium dichloride solution in toluene (concentration: 0.05 mmol/ml) was used as an alternative to the bis(cyclopentadienyl)titanium dichloride solution in toluene.

Solid Catalyst Component $F^2$

A solid catalyst component was prepared in the same way as in the preparation of the solid catalyst component $A^2$ except that the alumina V in Table 1 was used as an alternative to the silica I.

Solid Catalyst Component $G^2$

A solid catalyst component was prepared in the same way as in the preparation of the solid catalyst component $A^2$ except that the alumina VI in Table 1 was used as an alternative to the silica I.

Solid Catalyst Component $H^2$ 100 ml of purified toluene was fed into a three-necked 300 ml flask, then 10 g of silica III in Table 1 was added, and further added was 6.0 ml of a methylaluminoxane solution in toluene (concentration: 2.5 mmol/ml). After stirring at room temperature for 2 hours, drying was performed by blowing of nitrogen to obtain a particulate matter having fluidity.

50 ml of toluene was put into a three-necked flask, then 10 g of the carrier component just prepared above was added in a nitrogen atmosphere, and subsequently added was 34 ml of a methylaluminoxane solution in toluene (concentration: 2.5 mmol/ml). Further, 20 ml of a bis(cyclopentadienyl)zirconium dichloride solution in toluene (concentration: 2.5 mmol/ml) was added, followed by stirring at room temperature for 2 hours. Thereafter, the solvent was removed by blowing of nitrogen and under a reduced pressure to afford a solid catalyst component.

Solid Catalyst Component $I^2$

A solid catalyst component was prepared in the same way as in the preparation of the solid catalyst component $F^2$ except that the silica IV in Table 1 was used as a substitute for the silica III.

Solid Catalyst Component $J^2$ 100 ml of purified hexane was fed into a three-necked 300 ml flask, then 10 g of silica III in Table 1 was added, and further added was 10.0 ml of a triethylaluminum solution in hexane (concentration: 1.0 mmol/ml). After stirring at room temperature for 2 hours, drying was performed by blowing of nitrogen to obtain a particulate matter having fluidity.

50 ml of toluene was placed in a three-necked 300 ml flask, then 10 g of the carrier component just prepared above was added in a nitrogen atmosphere, and subsequently 40 ml of a methylaluminoxane solution in toluene (concentration: 2.5 mmol/ml) was added, and further added was 20 ml of a bis(cyclopentadienyl)zirconium dichloride solution in toluene, followed by stirring at room temperature for 2 hours. Thereafter, the solvent was removed by blowing of nitrogen and under a reduced pressure to afford a solid catalyst component.

Solid Catalyst Component $K^2$ 100 ml of purified butanol was fed into a three-necked 300 ml flask, then 10 g of silica III in Table 1 was added. After stirring at room temperature for 2 hours, drying was performed by blowing of nitrogen to obtain a particulate matter having fluidity.

50 ml of toluene was placed in a three-necked 300 ml flask, then 10 g of the carrier component just prepared above was added in a nitrogen atmosphere, subsequently 40 ml of a methylaluminoxane solution in toluene (concentration: 2.5 mmol/ml) was added, and further added was 20 ml of a bis(cyclopentadienyl)zirconium dichloride solution in toluene (concentration: 0.05 mmol/ml). After stirring at room temperature for 2 hours, the solvent was removed by blowing of nitrogen and under a reduced pressure to afford a solid catalyst component.

Solid Catalyst Component $L^2$

A solid catalyst component was prepared in the same way as in the preparation of the solid catalyst component $A^2$ except that the silica VII in Table 1 was used as a substitute for the silica I.

Solid Catalyst Component $M^2$

A solid catalyst component was prepared in the same way as in the preparation of the solid catalyst component $H^2$ except that the silica VIII in Table 1 was used as a substitute for the silica III.

Solid Catalyst Component $N^2$

A solid catalyst component was prepared in the same way as in the preparation of the solid catalyst component $K^2$ except that the silica IX in Table 1 was used as a substitute for the silica III.

Solid Catalyst Component $O^2$ 100 ml of purified toluene was fed into a three-necked 300 ml flask, then 10 g of silica I in Table 1 was added, and further added was 6.0 ml of a methylaluminoxane solution in toluene (concentration: 2.5 mmol/ml). After stirring at room temperature for 2 hours, drying was performed by blowing of nitrogen to obtain a particulate matter having fluidity.

50 ml of toluene was placed in a three-necked 300 ml flask, then 10 g of the carrier component just prepared above was added and subsequently added was 20 ml of an ethylenebis(indenyl)zirconium dichloride solution in toluene (concentration: 2.5 mmol/ml). After stirring at room temperature for 2 hours, the solvent was removed by blowing of nitrogen and under a reduced pressure to afford a solid catalyst component.

Solid Catalyst Component $P^2$

A solid catalyst component was prepared in the same way as in the preparation of the solid catalyst component $O^2$ except that the silica II in Table 1 was used as a substitute for the silica I.

Solid Catalyst Component $Q^2$

A solid catalyst component was prepared in the same way as in the preparation of the solid catalyst component $O^2$ except that the silica IX in Table 1 was used as a substitute for the silica I.

Example 1

A stainless steel autoclave equipped with a stirrer was used as a vapor-phase polymerization apparatus, and a loop was formed by using a blower, a flow control device and a dry cyclone. The temperature of the autoclave was adjusted by passing warm water through a jacket. The solid catalyst component A and triethylaluminum were fed at rates of 250 mg/hr and 50 mmol/hr, respectively, into the autoclave whose temperature had been adjusted to 80° C. Further, ethylene, butene-1 and hydrogen gases were introduced into the autoclave while making adjustment to give a butene-1/ ethylene mol ratio of 0.30 and a hydrogen/ethylene mol ratio of 0.1 in the vapor phase within the autoclave. The interior gases were circulated by means of the blower while maintaing the total pressure at 8 kg/cm²G and polymerization was conducted continuously for 10 hours while withdrawing the resulting polymer intermittently.

Catalytic activity was 260,000g.copolymer/g.Ti and thus very high. The ethylene copolymer obtained was a round particulate matter having a melt flow rate (MFR) of 0.95 g/10 min (at 190° C., a load of 2.16 kg, as defined by ASTM-D1238-65T), a density of 0.9203 g/cm³, a bulk density of 0.50 g/cm and an average particle diameter of 750 μm.

Upon inspection of the autoclave interior after the 10 hours' continuous polymerization, there was found no polymer deposited on the inner wall and the stirrer.

Examples 2–10 and Comparative Examples 1–3

Using solid catalyst components described in Table 2, polymerization was carried out in the same manner as in Example 1.

The results obtained are as shown in the same table.

TABLE 2

| | | | Evaluation Results of Polymerization | | | | | |
|---|---|---|---|---|---|---|---|---|
| | Solid Catalyst No. | Metal Oxide No. | Catalytic Activity g · polymer/ g · Ti | Bulk Density g/cm³ | MFR g/10 min | Density g/cm³ | Average Particle Diameter μm | Particle Shape |
| Example | | | | | | | | |
| 1 | A | I | 260,000 | 0.50 | 0.95 | 0.9203 | 750 | round |
| 2 | B | II | 250,000 | 0.49 | 0.94 | 0.9207 | 730 | " |
| 3 | C | I | 290,000 | 0.52 | 0.92 | 0.9208 | 770 | " |
| 4 | D | II | 280,000 | 0.51 | 0.87 | 0.9201 | 760 | " |
| 5 | E | III | 220,000 | 0.51 | 0.81 | 0.9212 | 680 | " |
| 6 | F | IV | 210,000 | 0.48 | 0.92 | 0.9211 | 660 | " |
| 7 | G | III | 230,000 | 0.50 | 0.99 | 0.9201 | 690 | " |
| 8 | H | IV | 220,000 | 0.48 | 0.98 | 0.9197 | 670 | " |
| 9 | I | V | 200,000 | 0.48 | 0.62 | 0.9222 | 650 | " |
| 10 | J | VI | 210,000 | 0.49 | 0.71 | 0.9208 | 660 | " |
| Comparative Example | | | | | | | | |
| 1 | K | VII | 250,000 | 0.32 | 1.01 | 0.9205 | 650 | irregular |
| 2 | L | VIII | 280,000 | 0.36 | 0.97 | 0.9204 | 520 | " |
| 3 | M | IX | 220,000 | 0.30 | 1.20 | 0.9196 | 530 | " |

TABLE 3

| | | | Evaluation Results of Polymerization | | | | | |
|---|---|---|---|---|---|---|---|---|
| | Solid Catalyst No. | Metal Oxide No. | Catalytic Activity g · polymer/ g · Ti | Bulk Density g/cm³ | MFI g/10 min | II wt % Silica | Average Particle Diameter μm | Particle Shape |
| Example | | | | | | | | |
| 11 | N | I | 150,000 | 0.48 | 7.8 | 98.0 | 650 | round |
| 12 | O | II | 180,000 | 0.46 | 5.6 | 97.5 | 680 | " |

TABLE 3-continued

| | Solid Catalyst No. | Metal Oxide No. | Catalytic Activity g · polymer/ g · Ti | Bulk Density g/cm³ | MFI g/10 min | II wt % Silica | Average Particle Diameter μm | Particle Shape |
|---|---|---|---|---|---|---|---|---|
| Comparative Example | | | | | | | | |
| 4 | P | IX | 150,000 | 0.33 | 6.6 | 97.0 | 480 | irregular |

Example 13

As a vapor-phase polymerization apparatus there was used the same apparatus as that described in Example 1. The solid catalyst component A', and a methylaluminoxane solution in toluene (concentration: 1 mmol/ml) were fed at rates of 100 mg/hr and 11 mmol/hr, respectively, into the autoclave whose temperature had been adjusted to 60° C. Further, ethylene and butene-1 gases were introduced while adjusting the butene-1/ethylene mol ratio in the vapor phase within the autoclave to 0.25. The interior gases were circulated by means of the blower while maintaining the total pressure at 8 kg/cm²G and polymerization was conducted continuously for 10 hours while withdrawing the resulting polymer intermittently.

Catalytic activity was 80,000 g.copolymer/g.Zr and thus very high. The ethylene copolymer obtained was a round particulate matter having a melt flow rate (MFR) of 1.00 g/10 min (at 190° C., a load of 2.16 kg, as defined by ASTM-D1238-65T), a density of 0.9203 g/cm³, a bulk density of 0.45 g/cm³ and an average particle diameter of 560 μm.

Upon inspection of the autoclave interior after the 10 hours' continuous polymerization, there was found no polymer deposited on the inner wall and the stirrer.

Examples 14–20 and Comparative Examples

Using solid catalyst components described in Table 4, polymerization was carried out in the same manner as in Example 13.

The results obtained are as shown in the same table.

Example 21

As a vapor-phase polymerization was carried out using the same apparatus that referred to in Example 13. The solid catalyst component I' was fed into the autoclave whose temperature had been adjusted to 60° C. Further, ethylene and butene-1 gases were introduced while adjusting the butene-1/ethylene mol ratio in the vapor phase within the autoclave to 0.05. The interior gases were circulated by means of the blower while maintaining the total pressure at 8 kg/cm²G and polymerization was conducted continuously for 10 hours while withdrawing the resulting polymer intermittently.

Catalytic activity was 120,000 g.copolymer/g.Zr and thus very high. The ethylene copolymer obtained was a round particulate matter having a melt flow rate (MFR) of 0.97 g/10 min, a density of 0.9208 g/cm³, a bulk density of 0.47 g/cm³ and an average particle diameter of 610 μm.

Upon inspection of the autoclave interior after the 10 hours' continuous polymerization, there was found no polymer deposited on the inner wall and the stirrer.

Example 22 and Comparative Example 7

Using solid catalyst components described in Table 4, polymerization was performed in the same manner as in Example 21.

The results obtained are as shown in the same table.

TABLE 4

| | Solid Catalyst No. | Metal Oxide No. | Catalytic Activity g · polymer/ g · Zr | Bulk Density g/cm³ | MFR g/10 min | Density g/cm³ | Melting Point °C. | Average Particle Diameter μm | Particle Shape |
|---|---|---|---|---|---|---|---|---|---|
| Example | | | | | | | | | |
| 13 | A¹ | I | 80,000 | 0.45 | 1.00 | 0.9210 | 114.1 | 560 | round |
| 14 | B¹ | II | 76,000 | 0.44 | 0.99 | 0.9207 | 115.0 | 540 | " |
| 15 | C¹ | III | 65,000 | 0.46 | 0.86 | 0.9212 | 107.3 | 480 | " |
| 16 | D¹ | IV | 61,000 | 0.43 | 0.97 | 0.9211 | 105.7 | 460 | " |
| 17 | E¹ | III | 72,000 | 0.45 | 1.04 | 0.9201 | 114.0 | 490 | " |
| 18 | F¹ | IV | 68,000 | 0.43 | 1.03 | 0.9197 | 113.8 | 470 | " |
| 19 | G¹ | V | 59,000 | 0.43 | 0.67 | 0.9222 | 106.3 | 450 | " |
| 20 | H¹ | VI | 62,000 | 0.44 | 0.76 | 0.9208 | 106.5 | 460 | " |
| 21 | I¹ | I | 125,000 | 0.47 | 0.97 | 0.9208 | 113.5 | 610 | " |
| 22 | J¹ | II | 116,000 | 0.46 | 0.92 | 0.9201 | 113.8 | 590 | " |
| Comparative Example | | | | | | | | | |
| 5 | K¹ | VII | 74,000 | 0.31 | 1.01 | 0.9205 | 113.2 | 550 | irregular |
| 6 | L¹ | VIII | 66,000 | 0.29 | 1.25 | 0.9196 | 109.4 | 330 | " |

TABLE 4-continued

| | Solid Catalyst No. | Metal Oxide No. | Catalytic Activity g · polymer/ g · Zr | Bulk Density g/cm$^3$ | MFR g/10 min | Density g/cm$^3$ | Melting Point °C. | Average Particle Diameter μm | Particle Shape |
|---|---|---|---|---|---|---|---|---|---|
| | 7 | M$^1$ | IX | 122,000 | 0.35 | 1.02 | 0.9204 | 113.1 | 380 | " |

Example 23

A stainless steel 3-liter autoclave equipped with a stirrer was purged with nitrogen, into which was fed 1 l of purified toluene, then 10 mmols of a methylaluminoxane solution in toluene and 1 g of the solid catalyst component N' were added. The temperature of the system was adjusted to 30° C. Propylene was introduced to a pressure of 3.5 kgf/cm$^2$G and polymerization was started, which was continued for 2 hours while feeding propylene continuously to maintain the total pressure at 3.5 kgf/cm$^2$G. Thereafter, unreacted gas was discharged, followed by cooling. The contents were withdrawn and the solvent removed to yield 18 g of a white polymer.

Catalytic activity was as high as 30,000 g.copolymer/g.Zr. The polymer was a round particulate matter having a bulk density of 0.46 g/cm$^3$, and an average particle diameter of 420yom. Its MFR, density and melting point were 5.3, 0.9042 g/cm$^3$ and 140.9° C., respectively.

Example 24 and Comparative Example 8

Using solid catalyst components described in Table 5, polymerization was carried out in the same manner as in Example 23.

The results obtained are as shown in the same table.

Example 25

As a vapor-phase polymerization apparatus there was used the same apparatus as that described in Example 1. The solid catalyst component A$^2$ and a methylaluminoxane solution in toluene (concentration: 1 mmol/ml) was fed at rates of 100 mg/hr and 30 mmol/hr, respectively, into the autoclave whose temperature had been adjusted to 60° C. Further, ethylene and butene-1 gases were introduced while adjusting the butene-1/ethylene mol ratio in the vapor phase within the autoclave to 0.25. The interior gases were circulated by means of the blower while maintaining the total pressure at 8 kg/cm$^2$G and polymerization was performed continuously for 10 hours while withdrawing the resulting polymer intermittently.

Catalytic activity was as high as 70,000 g.copolymer/g.Zr. The ethylene copolymer obtained was a round particulate matter having a melt flow rate (MFR) of 5.15 g/10 min (at 190° C., a load of 2.16 kg, as defined by ASTM-D1238-65T), a density of 0.9205 g/cm$^3$, a bulk density of 0.45 g/cm$^3$ and an average particle diameter of 460 μm.

Upon inspection of the autoclave interior after the 10 hours' continuous polymerization, there was found no polymer deposited on the inner wall and the stirrer.

Examples 26–31 and Comparative Example 9

Using solid catalyst components described in Table 6, polymerization was carried out in the same way as in Example 25.

The results obtained are as shown in Table 6.

Example 32

A vapor-phase polymerization was conducted using the same apparatus as that described in Example 25. The solid catalyst component H$^2$ was fed at rate of 100 mg/hr into the autoclave whose temperature had been adjusted to 60° C. Further, ethylene and butene-1 gases were introduced while adjusting the butene-1/ethylene mol ratio in the vapor phase within the autoclave to 0.25. The interior gases were circulated by means of the blower while maintaining the total pressure at 8 kg/cm$^2$G and polymerization was carrid out continuously for 10 hours while withdrawing the resulting polymer intermittently.

Catalytic activity was as high as 115,000 g.copolymer/g.Zr. The ethylene polymer obtained was a round particulate matter having a melt flow rate (MFR) of 5.22 g/10 min, a density of 0.9203 g/cm$^3$, a bulk density of 0.47 g/cm$^3$ and an average particle diameter of 520 μm.

Upon inspection of the autoclave interior after the 10 hours' continuous polymerization, there was found no polymer deposited on the inner wall and the stirrer.

TABLE 5

| | Solid Catalyst No. | Metal Oxide No. | Catalytic Activity g · polymer/ g · Zr | Bulk Density g/cm$^3$ | MFR g/10 min | Density g/cm$^3$ | Melting Point °C. | Average Particle Diameter μm | Particle Shape |
|---|---|---|---|---|---|---|---|---|---|
| Example | | | | | | | | | |
| 23 | N$^1$ | I | 30,000 | 0.46 | 5.3 | 0.9042 | 140.9 | 420 | round |
| 24 | O$^1$ | II | 32,000 | 0.46 | 5.6 | 0.9038 | 140.6 | 440 | " |
| Comparative Ex. | | | | | | | | | |
| 8 | P$^1$ | IX | 29,000 | 0.30 | 5.4 | 0.9039 | 140.1 | 310 | irregular |

Examples 33–35 and Comparative Examples 10–11

Using solid catalyst components described in Table 6, polymerization was carried out in the same way as in Example 32.

The results obtained are as set out in the same table.

Example 37 and Comparative Example 12

Using solid catalyst components described in Table 7, polymerization was carried out in the same way as in Example 36.

The results obtained are as set out in the same table.

TABLE 6

| | | | Evaluation Results of Polymerization | | | | | | |
|---|---|---|---|---|---|---|---|---|---|
| | Solid Catalyst No. | Metal Oxide No. | Catalytic Activity g · polymer/ g · Zr | Bulk Density g/cm$^3$ | MFR g/10 min | Density g/cm$^3$ | Melting Point °C. | Average Particle Diameter µm | Particle Shape |
| Example | | | | | | | | | |
| 25 | A$^2$ | I | 70,000 | 0.45 | 5.15 | 0.9205 | 113.6 | 460 | round |
| 26 | B$^2$ | II | 66,000 | 0.44 | 5.14 | 0.9202 | 114.5 | 440 | " |
| 27 | C$^2$ | I | 55,000 | 0.46 | 2.81 | 0.9207 | 114.8 | 380 | " |
| 28 | D$^2$ | I | 51,000 | 0.43 | 0.92 | 0.9206 | 105.2 | 360 | " |
| 29 | E$^2$ | I | 22,000 | 0.43 | 0.19 | 0.9196 | 113.5 | 390 | " |
| 30 | F$^2$ | V | 49,000 | 0.44 | 4.62 | 0.9217 | 112.8 | 350 | " |
| 31 | G$^2$ | VI | 52,000 | 0.45 | 5.11 | 0.9203 | 113.0 | 360 | " |
| 32 | H$^2$ | III | 115,000 | 0.47 | 5.22 | 0.9203 | 113.0 | 520 | " |
| 33 | I$^2$ | IV | 106,000 | 0.46 | 5.37 | 0.9196 | 113.3 | 490 | " |
| 34 | J$^2$ | III | 108,000 | 0.46 | 4.97 | 0.9182 | 113.5 | 500 | " |
| 35 | K$^2$ | III | 110,000 | 0.47 | 4.59 | 0.9201 | 113.1 | 510 | " |
| Comparative Example | | | | | | | | | |
| 9 | L$^2$ | VII | 64,000 | 0.29 | 5.96 | 0.9200 | 112.7 | 450 | irregular |
| 10 | M$^2$ | VIII | 56,000 | 0.27 | 5.20 | 0.9191 | 113.9 | 230 | " |
| 11 | N$^2$ | IX | 112,000 | 0.33 | 5.97 | 0.9199 | 112.6 | 280 | " |

Example 36

A stainless steel 3-liter autoclave equipped with a stirrer was purged with nitrogen, into which was fed 1 l of purified toluene, then 10 mmols of a methylaluminoxane solution in toluene and 1 g of the solid catalyst component N$^2$ were added. The temperature of the system was adjusted to 30° C. Propylene was introduced to a pressure of 3.5 kgf/cm$^2$G and polymerization was started which was continued for 2 hours while feeding propylene continuously to maintain the total pressure at 3.5 kgf/cm$^2$G. Thereafter, unreacted gas was discharged, followed by cooling. Then, the contents were withdrawn and the solvent removed to yield 18 g of a white polymer.

Catalitic activity was as high as 28,000 g.copolymer/g.Zr. The polymer was a round particulate matter having a bulk density of 0.45 g/cm$^3$, and an average particle diameter of 360 µm. Its MFR, density and melting point were 5.1, 0.9038 g/cm$^3$ and 140.9° C., respectively.

TABLE 7

| | | | Evaluation Results of Polymerization | | | | | | |
|---|---|---|---|---|---|---|---|---|---|
| | Solid Catalyst No. | Metal Oxide No. | Catalytic Activity g · polymer/ g · Me | Bulk Density g/cm$^3$ | MFR g/10 min | Density g/cm$^3$ | Melting Point °C. | Average Particle Diameter µm | Particle Shape |
| Example | | | | | | | | | |
| 36 | O$^2$ | I | 28,000 | 0.45 | 5.1 | 0.9038 | 140.9 | 360 | round |
| 37 | P$^2$ | II | 30,000 | 0.45 | 5.4 | 0.9034 | 140.5 | 370 | " |
| Comparative Example | | | | | | | | | |
| 12 | Q$^2$ | IX | 27,000 | 0.29 | 5.2 | 0.9035 | 140.2 | 280 | irregular |

What is claimed is:

1. A solid catalyst component for olefin polymerization, comprising a transition metal component comprising at least magnesium; titanium and/or vanadium; and halogen, and the particles of at least one oxide selected from silicon oxides and aluminum oxides, said silicon oxides and aluminum oxides satisfying the following characteristics (A) to (E):

(A) an average particle diameter as measured by the sieving method in the range of 20 to 150 μm;

(B) a specific surface area as measured by the BET method in the range of 150 to 600 m²/g;

(C) the volume of pores ranging in pore radius from 18 to 1,000 Angstroms as measured by the mercury penetration method in the range of 0.3 to 2.0 cm³/g;

(D) an apparent specific gravity as measured according to JIS K6220-6.8 is not lower than 0.32; and (E) after the particles classified in the range of between 53 μm and 75 μm by the sieving method have been subjected to an ultrasonic disintegration treatment at 40 KHz, 35 W, for 20 minutes, the proportion of 50 μm or smaller particles, is not more than 30%.

2. A solid catalyst component as set forth in claim 1, wherein the magnesium is a compound having the general formula:

$$Mg(OR)_n X_{2-n}$$

where R is a hydrocarbon group having 1 to 20 carbon atoms, X is a halogen atom and n is $0 \leq n \leq 2$.

3. An olefin polymerization catalyst comprising the solid catalyst component of claim 1 and an organometallic compound.

4. A solid catalyst component for olefin polymerization, comprising a transition metal component comprising at least magnesium; titanium and/or vanadium; and halogen, wherein the titanium is a compound having the general formula:

$$Ti(OR^1)_m X_{4-m}$$

wherein $R^1$ is a hydrocarbon radical having 1 to 20 carbon atoms, X is a halogen atom and n is $0 \leq m \leq 4$, and the particles of at least one oxide selected from silicon oxides and aluminum oxides, said silicon oxides and aluminum oxides satisfying the following characteristics (A) to (E):

(A) an average particle diameter as measured by the sieving method in the range of 20 to 150 μm;

(B) a specific surface area as measured by the BET method in the range of 150 to 600 m²/g;

(C) the volume of pores ranging in pore radius from 18 to 1,000 Angstroms as measured by the mercury penetration method in the range of 0.3 to 2.0 cm³/g;

(D) An apparent specific gravity as measured according to JIS K6220-6.8 not lower than 0.32; and (E) after the particles classified in the range of between 53 μm and 75 μm by the sieving method have been subjected to an ultrasonic disintegration treatment at 40 KHz, 35 W, for 20 minutes, the proportion of 50 μm or smaller particles, i.e., degree of ultrasonic disintegration, is not more than 30%.

5. A solid catalyst component for olefin polymerization, comprising a transition metal component comprising (1) a compound represented by the general formula $Me^1 R^1_n X^1_{4-n}$ where $R^1$ is a hydrocarbon radical having 1 to 24 carbon atoms, $X^1$ is a halogen atom, $Me^1$ is Zr, Ti or Hf, and n is $0 \leq n \leq 4$;

(2) a compound represented by the general formula $Me^2 R^2_m X^2_{z-m}$ where $R^2$ is a hydrocarbon radical having 1 to 24 carbon atoms, $X^2$ is a halogen atom, $M^2$ is an element of Groups I to III in the Periodic Table, z is the valence of $Me^2$, and m is $0 < m \leq z$; and (3) an organocyclic compound having two or more conjugated double bonds, the particles of at least one oxide selected from silicon oxides and aluminum oxides, said silicon oxides and aluminum oxides satisfying the following characteristics (A) to (E):

(A) an average particle diameter as measured by the sieving method in the range of 20 to 150 μm;

(B) a specific surface area as measured by the BET method in the range of 150 to 600 m²/g;

(C) the volume of pores ranging in pore radius from 18 to 1,000 Angstroms as measured by the mercury penetration method in the range of 0.3 to 2.0 cm³/g;

(D) an apparent specific gravity as measured according to JIS K6220-6.8 not lower than 0.32; and (E) after the particles classified in the range of between 53 μm and 75 μm by the sieving method have been subjected to an ultrasonic disintegration treatment at 40 KHz, 35 W, for 20 minutes, the proportion of 50 μm or smaller particles, i.e., degree of ultrasonic disintegration, is not more than 30%.

6. A solid catalyst component as set forth in claim 5, wherein the organocyclic compound is a compound having the general formula:

$$(Cp)_n SiR_n X_{4-m-n}$$

where Cp represents cyclopentadienyl, substituted cyclopentadienyl, indenyl or substituted indenyl, R represents a hydrocarbon group having 1 to 24 carbon atoms, X represents a halogen atom, m and n are $0 < m \leq 4$, $0 \leq n \leq 3$.

7. An olefin polymerization catalyst comprising the solid catalyst component in claim 5 and a modified organoaluminum compound obtained by the reaction of an organoaluminum compound with water and having Al—O—Al bond.

* * * * *